US012650799B2

(12) United States Patent (10) Patent No.: US 12,650,799 B2
Hirose et al. (45) Date of Patent: Jun. 9, 2026

(54) INFORMATION PROCESSING DEVICE, INFORMATION PROCESSING METHOD, AND IMAGING SYSTEM

(71) Applicant: Sony Group Corporation, Tokyo (JP)

(72) Inventors: Masaki Hirose, Tokyo (JP); Hiroshi Kiriyama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/861,597

(22) PCT Filed: Apr. 19, 2023

(86) PCT No.: PCT/JP2023/015648
§ 371 (c)(1),
(2) Date: Oct. 30, 2024

(87) PCT Pub. No.: WO2023/223759
PCT Pub. Date: Nov. 23, 2023

(65) Prior Publication Data
US 2025/0328304 A1 Oct. 23, 2025

(30) Foreign Application Priority Data
May 20, 2022 (JP) ................................. 2022-083041

(51) Int. Cl.
G06F 3/14 (2006.01)
H04N 5/222 (2006.01)
H04N 5/265 (2006.01)
(52) U.S. Cl.
CPC ......... G06F 3/1446 (2013.01); H04N 5/2224 (2013.01); H04N 5/265 (2013.01)

(58) Field of Classification Search
CPC ..... G06F 3/1446; H04N 5/2224; H04N 5/265
See application file for complete search history.

(56) References Cited

U.S. PATENT DOCUMENTS 6,396,495 B1 * 5/2002 Parghi .................... H04N 5/222
348/E5.022
6,476,874 B1 * 11/2002 Ito ........................ H04N 5/2226
348/E5.022

(Continued)

FOREIGN PATENT DOCUMENTS

EP 3355586 8/2018
JP 2001-086371 A 3/2001

(Continued)

OTHER PUBLICATIONS

Brompton Technologies: "User Manual Tessera Processing Verision 3.3", Mar. 11, 2022 (Mar. 11, 2022), XP093294691.

(Continued)

*Primary Examiner* — Ariel A Balaoing
(74) *Attorney, Agent, or Firm* — Paratus Law Group, PLLC

(57) ABSTRACT
An information processing device, among videos obtained by capturing a display video on a display and an object separated from the display by a camera, the display displaying a corresponding video generated corresponding to one camera among a plurality of cameras and a specific video in a time-division manner, performs video processing of replacing the specific video with a corresponding video for a first captured video including the object and the specific video, the corresponding video being generated corresponding to a camera that captures the first captured video.

18 Claims, 26 Drawing Sheets

(56) References Cited

U.S. PATENT DOCUMENTS

| | | | |
|---|---|---|---|
| 11,677,923 B1 * | 6/2023 | Thurston, III | G06F 3/1446 |
| | | | 348/42 |
| 2012/0223885 A1 * | 9/2012 | Perez | A63F 13/26 |
| | | | 345/158 |
| 2014/0168277 A1 * | 6/2014 | Ashley | G06F 3/1446 |
| | | | 345/672 |
| 2015/0260505 A1 * | 9/2015 | Nagano | G06T 7/73 |
| | | | 348/135 |
| 2015/0348326 A1 | 12/2015 | Sanders | |
| 2020/0145644 A1 * | 5/2020 | Cordes | G06T 15/50 |
| 2022/0343834 A1 * | 10/2022 | Fischer | G09G 3/32 |
| 2022/0382502 A1 * | 12/2022 | Zink | G06F 3/147 |
| 2024/0053943 A1 * | 2/2024 | Kim | H04N 21/43 |
| 2025/0124646 A1 * | 4/2025 | Altan | G06T 15/205 |
| 2025/0139879 A1 * | 5/2025 | Tsuchiya | G06T 7/194 |
| 2025/0159097 A1 * | 5/2025 | Yonezawa | G06T 7/70 |

FOREIGN PATENT DOCUMENTS

| | | |
|---|---|---|
| JP | 2002-199252 A | 7/2002 |
| JP | 4039610 B2 | 1/2008 |
| JP | 2008-092120 A | 4/2008 |
| JP | 2008-097191 A | 4/2008 |
| JP | 2010-213124 A | 9/2010 |

OTHER PUBLICATIONS

Megapixel Visual Reality: "Megapixel Technology Overview GhostFrame(TM) on the Helios LED Processing Platform", Feb. 28, 2022 (Feb. 28, 2022), pp. 1-34,XP093294708.

* cited by examiner

INFORMATION PROCESSING DEVICE, INFORMATION PROCESSING METHOD, AND IMAGING SYSTEM

CROSS REFERENCE TO PRIOR APPLICATION

This application is a National Stage Patent Application of PCT International Patent Application No. PCT/JP2023/015648 (filed on Apr. 19, 2023) under 35 U.S.C. § 371, which claims priority to Japanese Patent Application No. 2022-083041 (filed on May 20, 2022), which are all hereby incorporated by reference in their entirety.

TECHNICAL FIELD

The present technology relates to an information processing device, an information processing method, and an imaging system, and particularly relates to processing of a monitor video of imaging.

BACKGROUND ART

As an imaging method for producing a video content such as a movie, a technology is known in which a performer performs acting with what is called a green back and then a background video is synthesized.

Furthermore, in recent years, instead of green back shooting, an imaging system has been developed in which, in a studio provided with a large display, a background video is displayed on the display, and a performer performs acting in front thereof, whereby the performer and the background can be imaged, and the imaging system is known as what is called virtual production, in-camera VFX, or light emitting diode (LED) wall virtual production.

Patent Document 1 below discloses a technology of a system that images a performer acting in front of a background video.

CITATION LIST

Patent Document
    Patent Document 1: US Patent Application Publication
        No. 2020/0145644 A

SUMMARY OF THE INVENTION

Problems to be Solved by the Invention

When a background video is displayed on a large display, and then a performer and a background video are captured with a camera, there is no need to separately synthesize the background video after the capturing, and the performer and staff can visually understand the scene and perform acting or determine whether the acting is good or bad, or the like, which are more advantageous than green back shooting.

However, the appearance of the background should be different according to the position of the camera with respect to the display and the imaging direction. When only the background video is simply projected, the background does not change even if the position of the camera, the imaging direction, and the like are different, and the video becomes rather unnatural. Therefore, by changing the background video (at least the video in the range within the angle of view of the camera in the display) so as to be equivalent to an actual appearance according to the position of the camera, the imaging direction, and the like, it is possible to capture a video equivalent to the case of imaging at the actual location.

However, in a case where a plurality of cameras is used, since the positions of the cameras are physically different, backgrounds suitable for the respective cameras may overlap on the display, or a background of another camera may be imaged. As a result, the background of the monitor video of each camera may be in an incorrect state.

Thus, the present disclosure proposes a technology for obtaining a monitor video with an appropriate background for each camera in a case where a video displayed on a display is imaged by a plurality of cameras.

Solutions to Problems

An information processing device according to the present technology includes a video processing unit that performs video processing of replacing a specific video with a corresponding video for a first captured video including an object and the specific video, the corresponding video being generated corresponding to a camera that captures the first captured video, the first captured video being a video among videos obtained by capturing a display video on a display and the object separated from the display by a camera, the display displaying a corresponding video generated corresponding to one camera among a plurality of cameras and a specific video in a time-division manner.

For example, in a case where a corresponding video such as a background is displayed on a display and imaging is performed by a plurality of cameras, a specific video is displayed and a timing of capturing the specific video and an object is provided. Then, for the first captured video in this case, processing of replacing the specific video portion with the corresponding video corresponding to each camera is performed.

BRIEF DESCRIPTION OF DRAWINGS

FIG. 3 is an explanatory diagram of a background video according to a camera position of the imaging system of the embodiment.

FIG. 5 is a block diagram of the imaging system of the embodiment.

FIG. 7 is a block diagram of the imaging system using a plurality of cameras of the embodiment.

FIG. 10 is a configuration example block diagram including a switcher.

FIG. 13 is a block diagram of a configuration example of a first embodiment.

FIG. 18 is a block diagram of a configuration example of a second embodiment.

FIG. 22 is a block diagram of a configuration example of a fourth embodiment.

MODE FOR CARRYING OUT THE INVENTION

Figure 1:
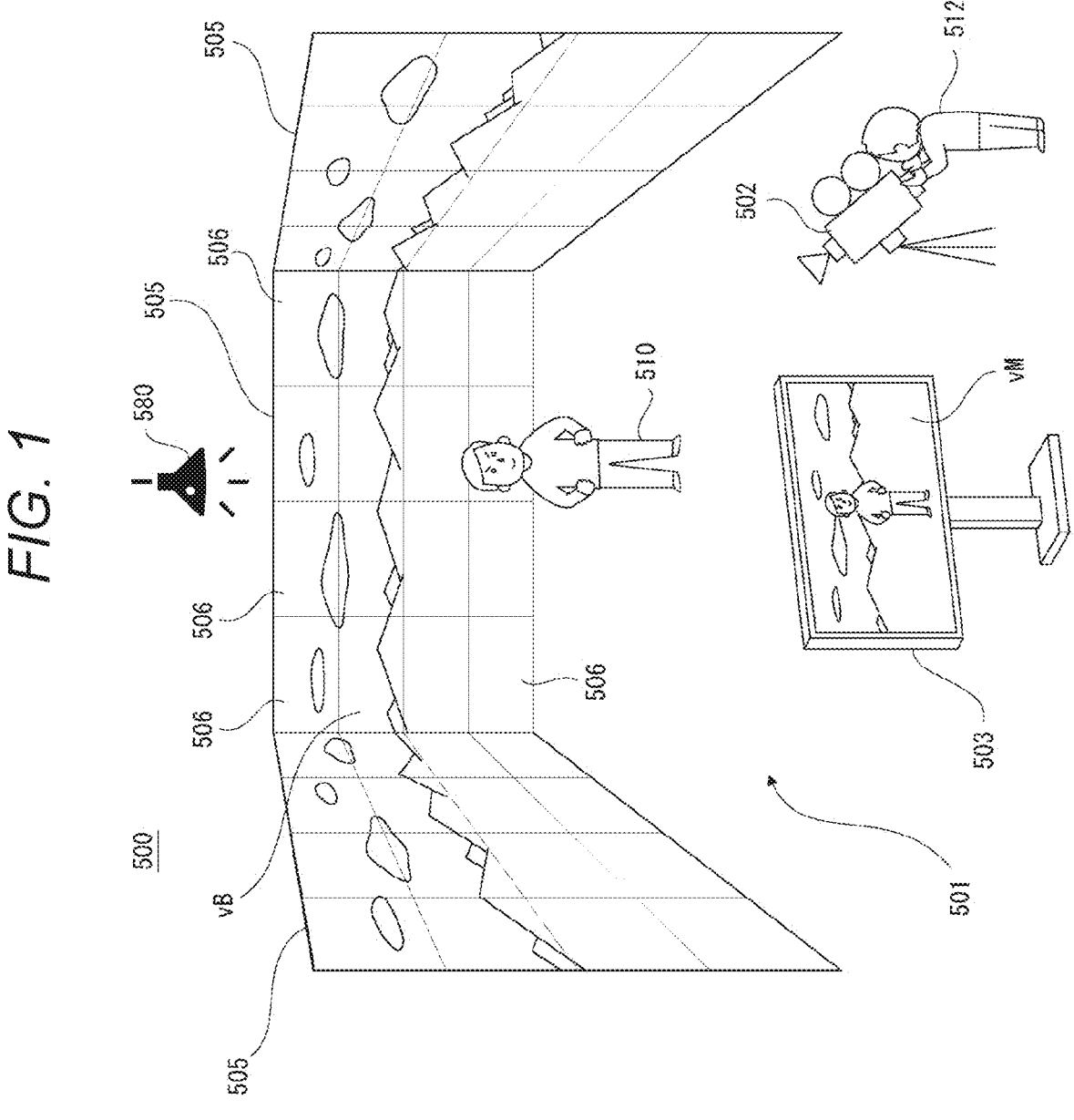
FIG. 1 is an explanatory diagram of an imaging system of an embodiment of the present technology.

Hereinafter, embodiments will be described in the following order.
<1. Imaging System and Content Production>
<2. Configuration of Information Processing Device>
<3. Imaging System using a Plurality of Cameras and Switcher>
<4. First Embodiment>
<5. Second Embodiment>
<6. Third Embodiment>
<7. Fourth Embodiment>
<8. Fifth Embodiment>
<9. Summary and Modification Examples>

Note that, in the present disclosure, "video" or "image" includes both a still image and a moving image. Furthermore, "video" refers not only to a state in which the video is displayed on a display, but also video data in a state in which the video data is not displayed on a display may be comprehensively referred to as "video".

For example, in the embodiments, a background video before being displayed on a display, a video captured by a camera, and a background video or a captured video switched by a switcher are not a video actually being displayed but video data. Such video data is referred to as "background video", "captured video", or the like for convenience.

Furthermore, a plurality of cameras is denoted by adding "a", "b", "c", . . . to the reference numerals to be written as "camera 502a" and "camera 502b", and when being collectively referred to, "camera 502" is used. Furthermore, circuit units, functions, signals, and the like corresponding to the respective cameras are also distinguished by adding "a", "b", "c", . . . to numerals or characters as reference numerals, and in the case of being collectively referred to, only reference numerals excluding "a", "b", and "c" are used.

1. Imaging System and Video Content Production

An imaging system to which the technology of the present disclosure can be applied and production of a video content will be described.

FIG. 1 schematically illustrates an imaging system 500. The imaging system 500 is a system that performs imaging as virtual production, and a part of equipment arranged in an imaging studio is illustrated in the drawing.

In the imaging studio, a performance area 501 in which a performer 510 performs performance such as acting is provided. A large display device is arranged on at least the back surface, the left and right side surfaces, and the upper surface of the performance area 501. Although the device type of the display device is not limited, the drawing illustrates an example in which an LED wall 505 is used as an example of the large display device.

One LED wall 505 forms a large panel by vertically and horizontally connecting and arranging a plurality of LED panels 506. The size of the LED wall 505 is not particularly limited, but only needs to be a size that is necessary or sufficient as a size for displaying a background when the performer 510 is imaged.

A necessary number of lights 580 are arranged at necessary positions such as above or on the side of the performance area 501 to illuminate the performance area 501.

In the vicinity of the performance area 501, for example, a camera 502 for imaging a movie or other video content is arranged. A camera operator 512 can move the position of the camera 502, and can perform an operation of an imaging direction, an angle of view, or the like. Of course, it is also conceivable that movement, angle of view operation, or the like of the camera 502 is performed by remote control. Furthermore, the camera 502 may automatically or autonomously move or change the angle of view. For this reason, the camera 502 may be mounted on a camera platform or a mobile body.

The camera 502 collectively captures the performer 510 in the performance area 501 and the video displayed on the LED wall 505. For example, by displaying a scene as a background video vB on the LED wall 505, it is possible to capture a video similar to that in a case where the performer 510 actually exists and performs acting at the place of the scene.

An output monitor 503 is arranged near the performance area 501. The video being captured by the camera 502 is displayed on the output monitor 503 in real time as a monitor video vM. As a result, a director and staff who produce a video content can check the captured video.

As described above, the imaging system 500 that images performance of the performer 510 in the background of the LED wall 505 in the imaging studio has various advantages as compared with the green back shooting.

For example, in the case of the green back shooting, it is difficult for the performer to imagine the background and the situation of the scene, which may affect the acting. On the other hand, by displaying the background video vB, the performer 510 can easily perform acting, and the quality of acting is improved. Furthermore, it is easy for the director and other staff members to determine whether or not the acting of the performer 510 matches the background or the situation of the scene.

Furthermore, post-production after imaging is more efficient than in the case of the green back shooting. This is because what is called a chroma key composition may be unnecessary or color correction or reflection composition may be unnecessary. Furthermore, even in a case where the chroma key composition is required at the time of imaging, the background screen does not need to be added, which is also helpful to improve efficiency.

In the case of the green back shooting, the hue of the green increases on the performer's body, dress, and objects, and thus correction thereof is necessary. Furthermore, in the case of the green back shooting, in a case where there is an object in which a surrounding scene is reflected, such as glass, a mirror, or a snowdome, it is necessary to generate and synthesize an image of the reflection, but this is troublesome work.

On the other hand, in a case of imaging by the imaging system 500 in FIG. 1, the hue of the green does not increase, and thus the correction is unnecessary. Furthermore, by displaying the background video vB, the reflection on the actual article such as glass is naturally obtained and captured, and thus, it is also unnecessary to synthesize the reflection video.

Here, the background video vB will be described with reference to FIGS. 2 and 3. Even if the background video vB is displayed on the LED wall 505 and captured together with the performer 510, the background of the captured video becomes unnatural only by simply displaying the background video vB. This is because a background that is three-dimensional and has depth is actually used as the background video vB in a planar manner.

For example, the camera 502 can image the performer 510 in the performance area 501 from various directions, and can also perform a zoom operation. The performer 510 also does not stop at one place. Then, the actual appearance of the background of the performer 510 should change according to the position, the imaging direction, the angle of view, and the like of the camera 502, but such a change cannot be obtained in the background video vB as the planar video. Accordingly, the background video vB is changed so that the background is similar to the actual appearance including a parallax.

Figure 2:
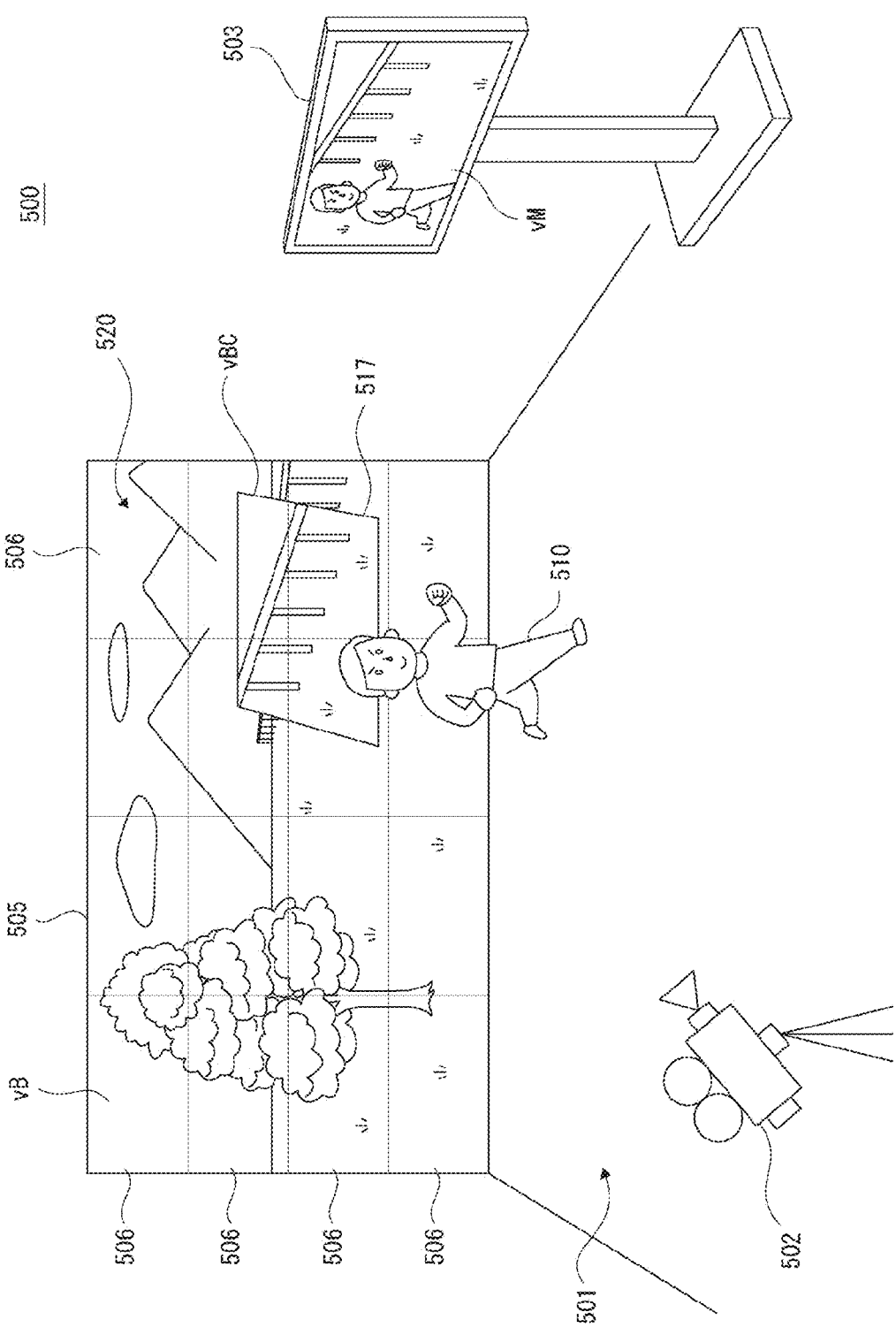
FIG. 2 is an explanatory diagram of a background video according to a camera position of the imaging system of the embodiment.
Figure 3:
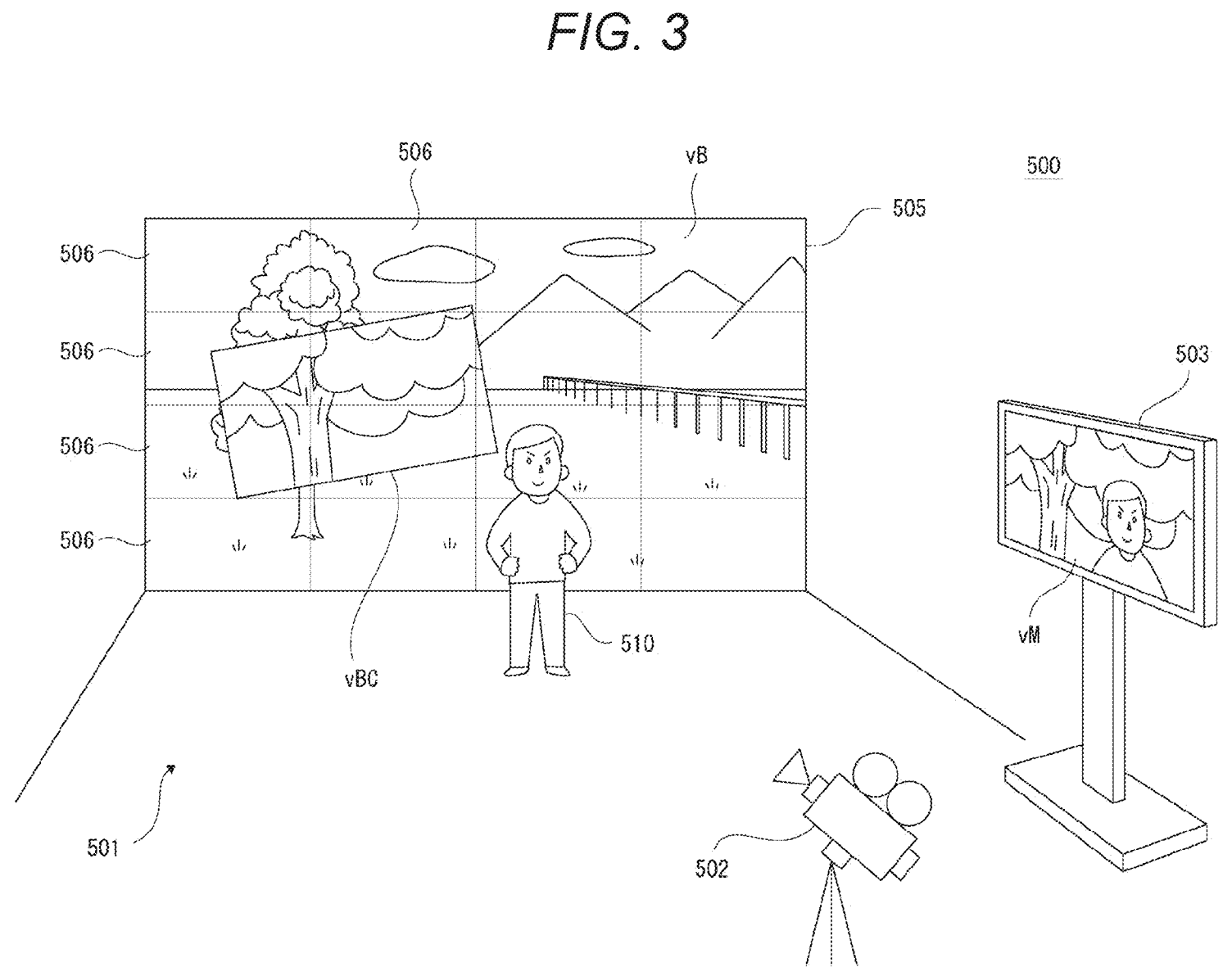

FIG. 2 illustrates a state in which the camera 502 is imaging the performer 510 from a position on the left side of the drawing, and FIG. 3 illustrates a state in which the camera 502 is imaging the performer 510 from a position on the right side of the drawing. In each drawing, a capturing region video vBC is illustrated in the background video vB.

Note that a portion of the background video vB excluding the capturing region video vBC is referred to as an "outer frustum", and the capturing region video vBC is referred to as an "inner frustum".

The background video vB described here indicates the entire video displayed as the background including the capturing region video vBC (inner frustum).

The range of the capturing region video vBC (inner frustum) corresponds to a range actually imaged by the camera 502 in the display surface of the LED wall 505. Then, the capturing region video vBC is a video that is transformed so as to express a scene that is actually viewed when the position of the camera 502 is set as a viewpoint according to the position, the imaging direction, the angle of view, and the like of the camera 502.

Specifically, three dimensions (3D) background data that is a 3D model as a background is prepared, and the capturing region video vBC is sequentially rendered on the basis of the viewpoint position of the camera 502 with respect to the 3D background data in real time.

Note that the range of the capturing region video vBC is actually a range slightly wider than the range imaged by the camera 502 at the time point. This is to prevent the video of the outer frustum from being reflected due to a drawing delay and to avoid the influence of the diffracted light from the video of the outer frustum when the range of imaging is slightly changed by panning, tilting, zooming, or the like of the camera 502.

The video of the capturing region video vBC rendered in real time in this manner is synthesized with the video of the outer frustum. The video of the outer frustum used in the background video vB is rendered in advance on the basis of the 3D background data, and the video is incorporated as the capturing region video vBC rendered in real time into a part of the video of the outer frustum to generate the entire background video vB.

As a result, even when the camera 502 is moved back and forth, or left and right, or a zoom operation is performed, the background of the range imaged together with the performer 510 is captured as a video corresponding to the viewpoint position change accompanying the actual movement of the camera 502.

As illustrated in FIGS. 2 and 3, the monitor video vM including the performer 510 and the background is displayed on the output monitor 503, and this is the captured video. The background of the monitor video vM is the capturing region video vBC. That is, the background included in the captured video is a real-time rendered video.

As described above, in the imaging system 500 of the embodiment, the background video vB including the capturing region video vBC is changed in real time so that not only the background video vB is simply displayed in a planar manner but also a video similar to that in a case of actually imaging on location can be captured.

Note that a processing load of the system is also reduced by rendering only the capturing region video vBC as a range reflected by the camera 502 in real time instead of the entire background video vB displayed on the LED wall 505.

Figure 4:
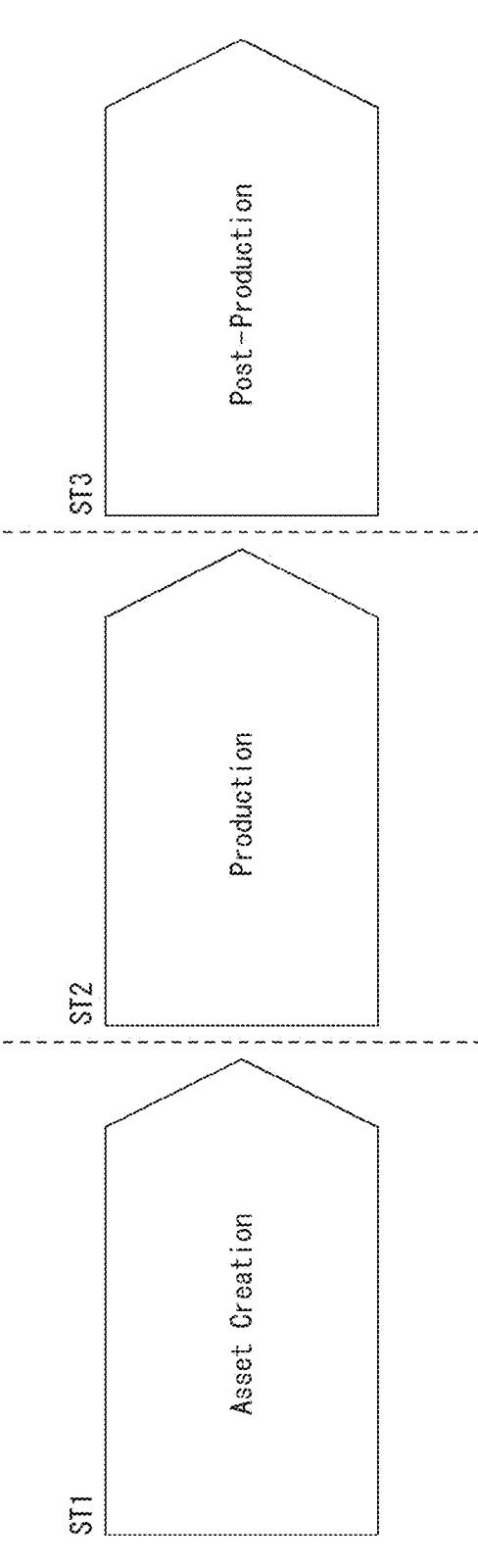
FIG. 4 is an explanatory diagram of a video content producing step of the embodiment.

Here, a producing step for a video content as virtual production in which imaging is performed by the imaging system 500 will be described. As illustrated in FIG. 4, the video content producing step is roughly divided into three stages. The stages are asset creation ST1, production ST2, and post-production ST3.

The asset creation ST1 is a step of producing 3D background data for displaying the background video vB. As described above, the background video vB is generated by performing rendering in real time using the 3D background data at the time of imaging. For this purpose, 3D background data as a 3D model is produced in advance.

Examples of a method of producing the 3D background data include full computer graphics (CG), point cloud data (Point Cloud) scan, and photogrammetry.

The full CG is a method of producing a 3D model with computer graphics. Among the three methods, the full CG requires the most man-hours and time, but is preferably used in a case where an unrealistic video, a video that is difficult to capture in practice, or the like is desired to be the background video vB.

The point cloud data scanning is a method of generating a 3D model based on the point cloud data by performing distance measurement from a certain position using, for example, LiDAR, capturing an image of 360 degrees by a camera from the same position, and placing color data captured by the camera on a point measured by the LiDAR. Compared with the full CG, a 3D model can be produced in a short time. Furthermore, it is easy to produce a 3D model with higher definition than that of the photogrammetry.

The photogrammetry is a photogrammetry technology for analyzing parallax information from two-dimensional images obtained by capturing an object from a plurality of viewpoints to obtain the dimensions and the shape. 3D model production can be performed in a short time.

Note that the point cloud information acquired by the LiDAR may be used in the 3D data generation by the photogrammetry.

In the asset creation ST1, for example, a 3D model to be 3D background data is produced using these methods. Of course, the above methods may be used in combination. For example, a part of a 3D model produced by the point cloud data scanning or the photogrammetry is produced by CG and synthesized or the like.

The production ST2 is a step of performing imaging in the imaging studio as illustrated in FIG. 1. Element technologies in this case include real-time rendering, background display, camera tracking, illumination control, and the like.

The real-time rendering is rendering processing for obtaining the capturing region video vBC at each time point (each frame of the background video vB) as described with reference to FIGS. 2 and 3. This is to render the 3D background data produced in the asset creation ST1 from a viewpoint corresponding to the position of the camera 502 or the like at each time point.

In this way, the real-time rendering is performed to generate the background video vB of each frame including the capturing region video vBC, and the background video vB is displayed on the LED wall 505.

The camera tracking is performed to obtain imaging information by the camera 502, and tracks position information, the imaging direction, the angle of view, and the like at each time point of the camera 502. By providing the imaging information including these pieces of information to a rendering engine in association with each frame, real-time rendering according to the viewpoint position or the like of the camera 502 can be executed.

The imaging information is information linked with or associated with a video as metadata.

It is assumed that the imaging information includes position information of the camera 502 at each frame timing, a direction of the camera, an angle of view, a focal length, an F value (aperture value), a shutter speed, lens information, and the like.

The illumination control is to control the state of illumination in the imaging system 500, and specifically, to control the light amount, emission color, illumination direction, and the like of the light 580. For example, the illumination control is performed according to time setting, place setting, and the like of a scene to be imaged.

The post-production ST3 indicates various processing performed after imaging. For example, video correction, video adjustment, clip editing, video effect, and the like are performed.

As the video correction, color gamut conversion, color matching between cameras and materials, and the like may be performed.

As the video adjustment, color adjustment, luminance adjustment, contrast adjustment, and the like may be performed.

As the clip editing, cutting of clips, adjustment of order, adjustment of a time length, and the like may be performed.

As the video effect, a synthesis of a CG video or a special effect video or the like may be performed.

Next, a configuration of the imaging system 500 used in the production ST2 will be described.

Figure 5:
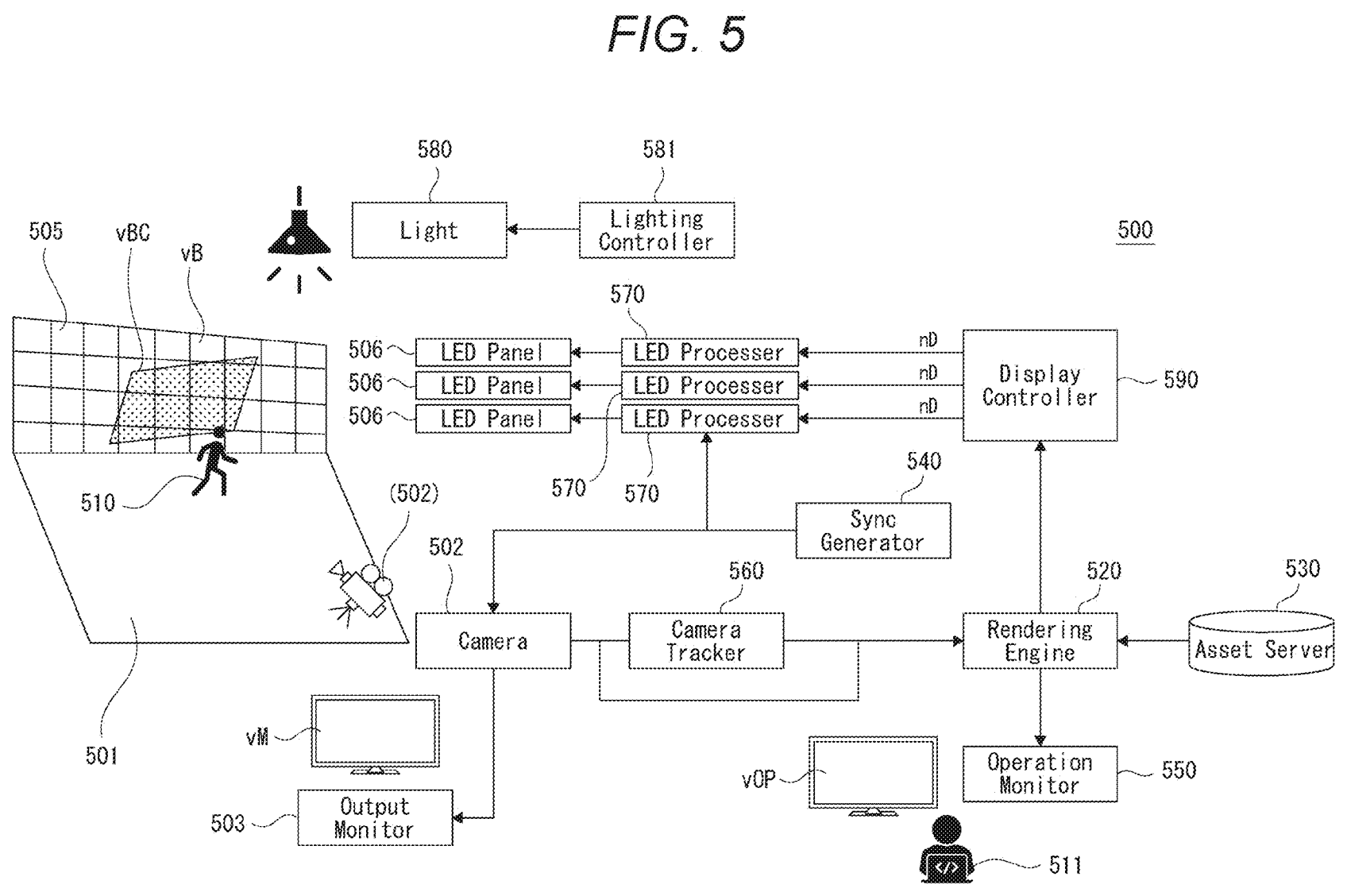

FIG. 5 is a block diagram illustrating a configuration of the imaging system 500 with the outline that has been described with reference to FIGS. 1, 2, and 3.

The imaging system 500 illustrated in FIG. 5 includes the above-described LED wall 505 including the plurality of LED panels 506, the camera 502, the output monitor 503, and the light 580. As illustrated in FIG. 5, the imaging system 500 further includes a rendering engine 520, an asset server 530, a sync generator 540, an operation monitor 550, a camera tracker 560, LED processors 570, a lighting controller 581, and a display controller 590.

Each of the LED processors 570 is provided corresponding to one or the plurality of LED panels 506, and performs video display drive of the corresponding one or the plurality of LED panels 506.

The sync generator 540 generates a synchronization signal for synchronizing frame timings of display videos by the LED panels 506 and a frame timing of imaging by the camera 502, and supplies the synchronization signal to the respective LED processors 570 and the camera 502. However, this does not prevent output from the sync generator 540 from being supplied to the rendering engine 520.

The camera tracker 560 generates imaging information by the camera 502 at each frame timing and supplies the imaging information to the rendering engine 520. For example, the camera tracker 560 detects the position information of the camera 502 relative to the position of the LED wall 505 or a predetermined reference position and the imaging direction of the camera 502 as one piece of the imaging information, and supplies them to the rendering engine 520.

As a specific detection method by the camera tracker 560, there is a method of randomly arranging reflectors on the ceiling and detecting a position from reflected light of infrared light emitted from the camera tracker 560 to the reflectors, the camera tracker 560 being assembled to the camera 502. Furthermore, as a detection method, there is also a method of estimating the self-position of the camera 502 by information of a gyro mounted on the camera platform of the camera 502 or the main body of the camera 502, or image recognition of a video captured by the camera 502.

Furthermore, an angle of view, a focal length, an F value, a shutter speed, lens information, and the like may be supplied from the camera 502 to the rendering engine 520 as the imaging information.

The asset server 530 is a server that can store a 3D model produced in the asset creation ST1, that is, 3D background data on a recording medium and read the 3D model as necessary. That is, the asset server 530 functions as a data base (DB) of 3D background data.

The rendering engine 520 performs processing of generating the background video vB to be displayed on the LED wall 505. For this reason, the rendering engine 520 reads necessary 3D background data from the asset server 530. Then, the rendering engine 520 generates a video of the outer frustum used in the background video vB as a video obtained by rendering the 3D background data in a form of being viewed from spatial coordinates designated in advance.

Furthermore, as processing for each frame, the rendering engine 520 specifies the viewpoint position and the like with respect to the 3D background data using the imaging information supplied from the camera tracker 560 or the camera 502, and renders the capturing region video vBC (inner frustum).

Moreover, the rendering engine 520 synthesizes the outer frustum generated in advance with the capturing region video vBC rendered for each frame to generate the background video vB as the video data of one frame. Then, the rendering engine 520 transmits the generated video data of one frame to the display controller 590.

The display controller 590 generates divided video signals nD obtained by dividing the video data of one frame into video portions to be displayed on the respective LED panels 506, and transmits the divided video signals nD to the respective LED panels 506. At this time, the display controller 590 may perform calibration according to individual differences of color development or the like, manufacturing errors, and the like between display units.

Note that the display controller 590 may not be provided, and the rendering engine 520 may perform these pieces of processing. That is, the rendering engine 520 may generate the divided video signals nD, perform calibration, and transmit the divided video signals nD to the respective LED panels 506.

By the LED processors 570 driving the respective LED panels 506 on the basis of the respective received divided video signals nD, the entire background video vB is displayed on the LED wall 505. The background video vB includes the capturing region video vBC rendered according to the position of the camera 502 or the like at the time point.

The camera 502 can capture performance of the performer 510 including the background video vB displayed on the LED wall 505 in this manner. The video obtained by imaging by the camera 502 is recorded on a recording medium in the camera 502 or an external recording device (not illustrated), and is supplied to the output monitor 503 in real time and displayed as the monitor video vM.

The operation monitor 550 displays an operation image vOP for controlling the rendering engine 520. An engineer 511 can perform necessary settings and operations regarding rendering of the background video vB while viewing the operation image vOP.

The lighting controller 581 controls emission intensity, emission color, irradiation direction, and the like of the light 580. For example, the lighting controller 581 may control the light 580 asynchronously with the rendering engine 520, or may perform control in synchronization with the imaging information and the rendering processing. Therefore, the lighting controller 581 may perform light emission control in accordance with an instruction from the rendering engine 520, a master controller (not illustrated), or the like.

Figure 6:
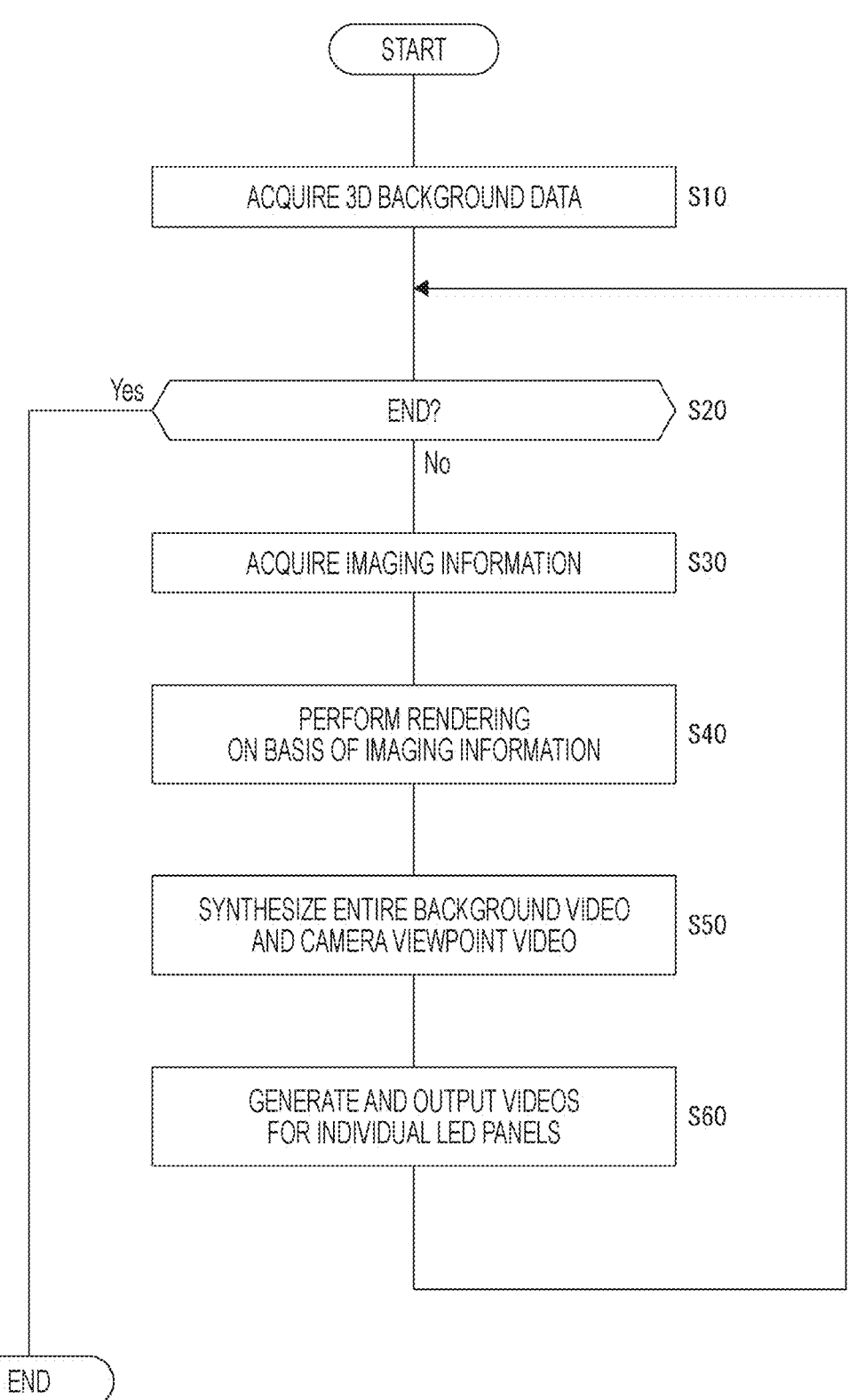
FIG. 6 is a flowchart of background video generation of the imaging system of the embodiment.

FIG. 6 illustrates a process example of the rendering engine 520 in the imaging system 500 having such a configuration.

In step S10, the rendering engine 520 reads the 3D background data to be used this time from the asset server 530, and develops the 3D background data in an internal work area.

Then, a video to be used as the outer frustum is generated.

Thereafter, the rendering engine 520 repeats the processing from step S30 to step S60 at each frame timing of the background video vB until it is determined in step S20 that the display of the background video vB based on the read 3D background data is ended.

In step S30, the rendering engine 520 acquires the imaging information from the camera tracker 560 and the camera 502. As a result, the position and state of the camera 502 to be reflected in the current frame are checked.

In step S40, the rendering engine 520 performs rendering on the basis of the imaging information. That is, the viewpoint position with respect to the 3D background data is specified on the basis of the position, the imaging direction, the angle of view, or the like of the camera 502 to be reflected in the current frame, and rendering is performed. At this time, video processing reflecting the focal length, the F value, the shutter speed, the lens information, and the like can also be performed. By this rendering, video data as the capturing region video vBC can be obtained.

In step S50, the rendering engine 520 performs processing of synthesizing the outer frustum, which is the entire background video, and the video reflecting the viewpoint position of the camera 502, that is, the capturing region video vBC. For example, the processing is to synthesize a video of the entire background rendered at a specific reference viewpoint with a video generated by reflecting the viewpoint of the camera 502. With this processing, the background video vB of one frame displayed on the LED wall 505, that is, the background video vB including the capturing region video vBC is generated.

The processing in step S60 is performed by the rendering engine 520 or the display controller 590. In step S60, the rendering engine 520 or the display controller 590 generates the divided video signals nD obtained by dividing the background video vB of one frame into videos to be displayed on the individual LED panels 506. Calibration may be performed. Then, each divided video signals nD are transmitted to the respective LED processors 570.

By the above processing, the background video vB including the capturing region video vBC captured by the camera 502 is displayed on the LED wall 505 at each frame timing.

Figure 7:
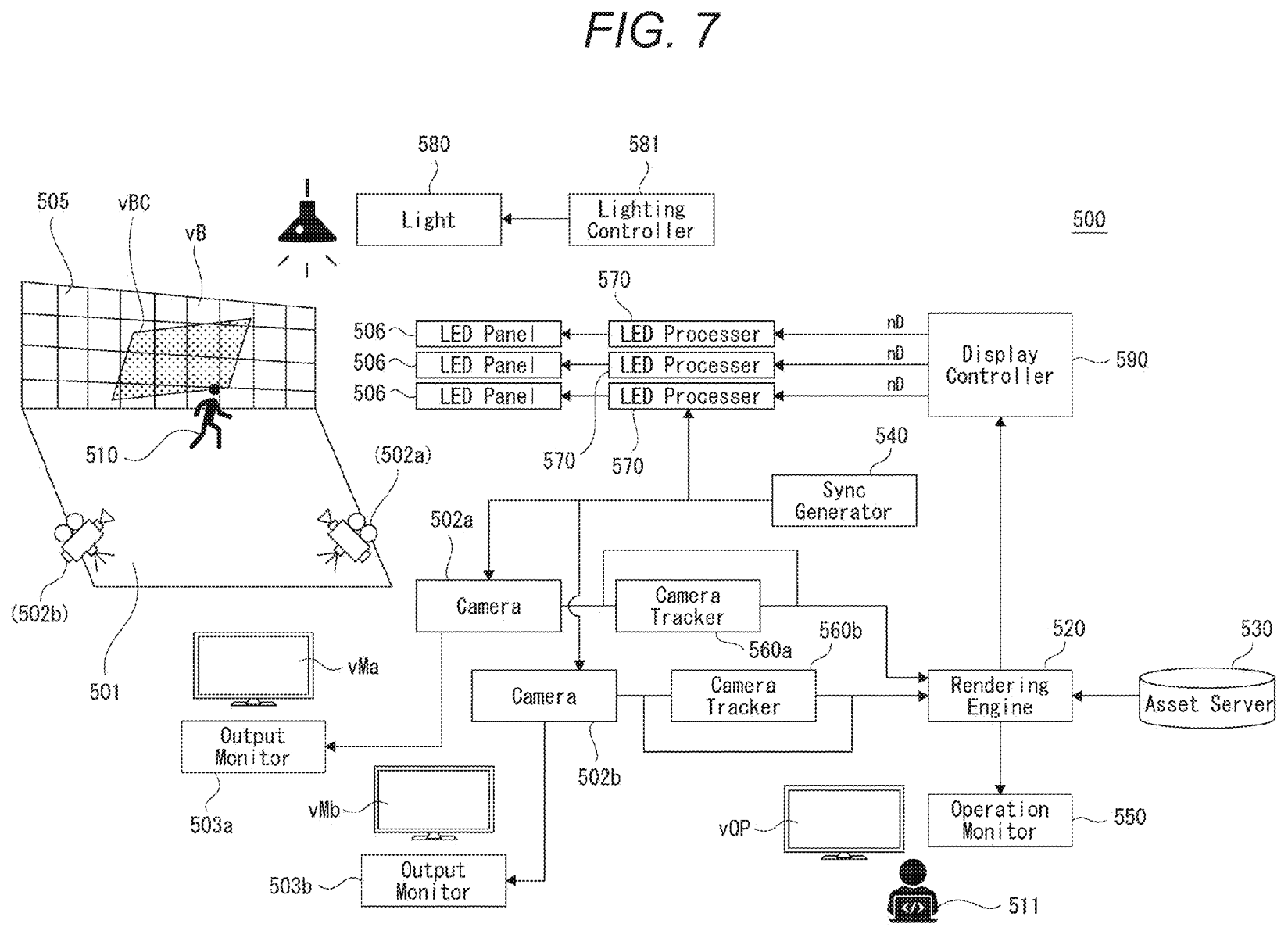

Incidentally, only one camera 502 is illustrated in FIG. 5, but imaging can be performed by a plurality of cameras 502. FIG. 7 illustrates a configuration example in a case where a plurality of cameras 502a and 502b is used. The cameras 502a and 502b can independently perform imaging in the performance area 501. Furthermore, synchronization between the cameras 502a and 502b and the respective LED processors 570 is maintained by the sync generator 540.

Output monitors 503a and 503b are provided corresponding to the cameras 502a and 502b, and are configured to display the videos captured by the corresponding cameras 502a and 502b as monitor videos vMa and vMb, respectively.

Furthermore, camera trackers 560a and 560b are provided corresponding to the cameras 502a and 502b, respectively, and detect the positions and imaging directions of the corresponding cameras 502a and 502b, respectively. The imaging information from the camera 502a and the camera tracker 560a and the imaging information from the camera 502b and the camera tracker 560b are transmitted to the rendering engine 520.

The rendering engine 520 can perform rendering to obtain the background video vB of each frame using the imaging information of either the camera 502a side or the camera 502b side.

Note that although FIG. 7 illustrates an example using the two cameras 502a and 502b, it is also possible to perform imaging using three or more cameras 502.

However, in a case where the plurality of cameras 502 is used, there is a circumstance that the capturing region video vBC corresponding to each camera 502 interferes. For example, in the example in which the two cameras 502a and 502b are used as illustrated in FIG. 7, the capturing region video vBC corresponding to the camera 502a is illustrated, but in a case where the video of the camera 502b is used, the capturing region video vBC corresponding to the camera 502b is also necessary. When the capturing region video vBC corresponding to each of the cameras 502a and 502b is simply displayed, they interfere with each other. Therefore, it is necessary to contrive the display of the capturing region video vBC.

2. Configuration of Information Processing Device

Next, a configuration example of an information processing device 70 that can be used in the asset creation ST1, the production ST2, and the post-production ST3 will be described with reference to FIG. 8.

The information processing device 70 is a device capable of performing information processing, particularly video processing, such as a computer device. Specifically, a personal computer, a workstation, a portable terminal device such as a smartphone and a tablet, a video editing device, and the like are assumed as the information processing device 70. Furthermore, the information processing device 70 may be a computer device configured as a server device or an arithmetic device in cloud computing.

In the case of the present embodiment, specifically, the information processing device 70 can function as a 3D model production device that produces a 3D model in the asset creation ST1.

Furthermore, the information processing device 70 can also function as the rendering engine 520 and the asset server 530 constituting the imaging system 500 used in the production ST2.

Furthermore, the information processing device 70 can also function as a video editing device that performs various types of video processing in the post-production ST3.

Furthermore, the information processing device 70 is also used as a switcher 600 described later with reference to FIG. 10 and the like. The switcher 600 includes not only a switching circuit of a signal by hardware but also a function of the information processing device 70 to perform control and calculation.

Figure 13:
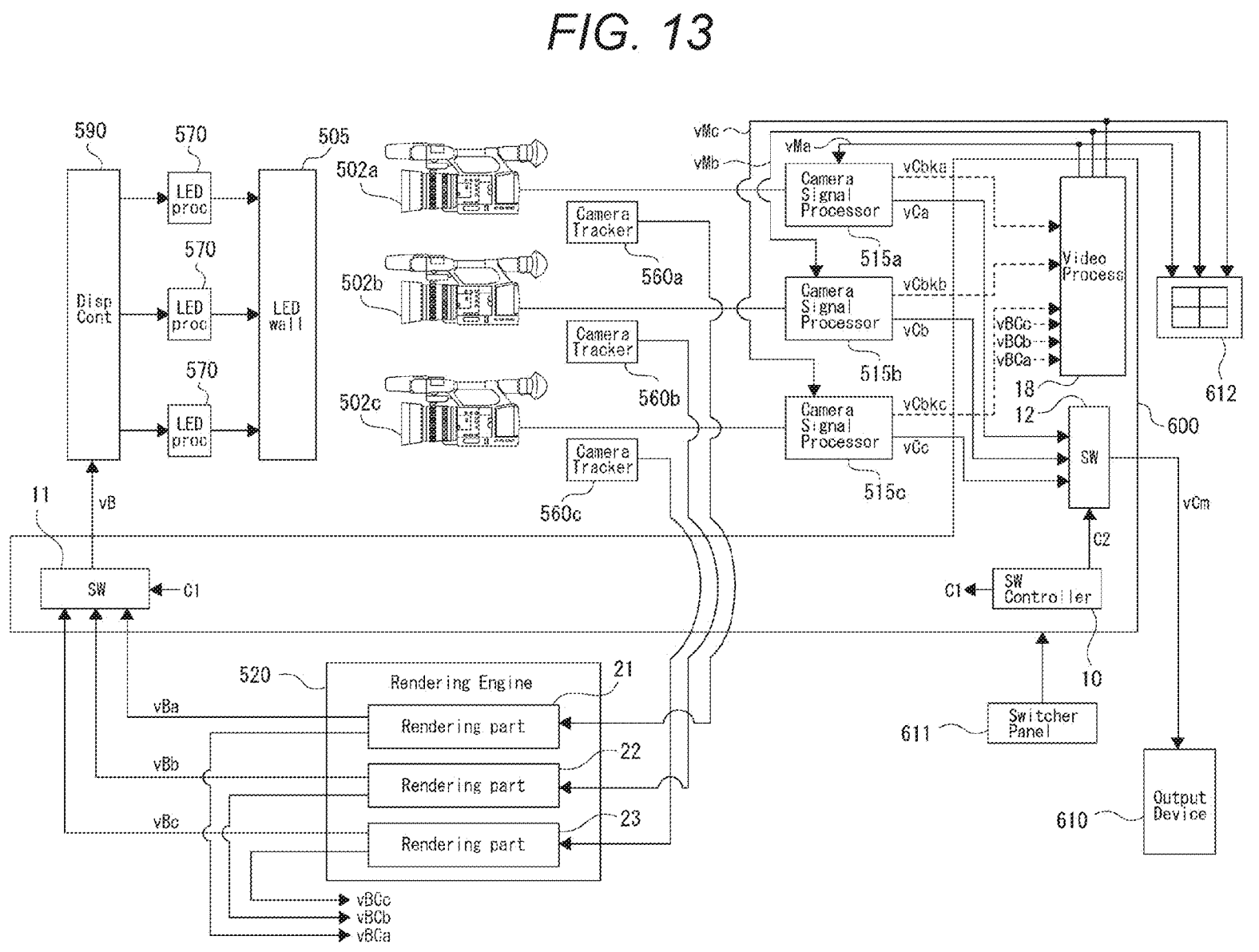
Figure 22:
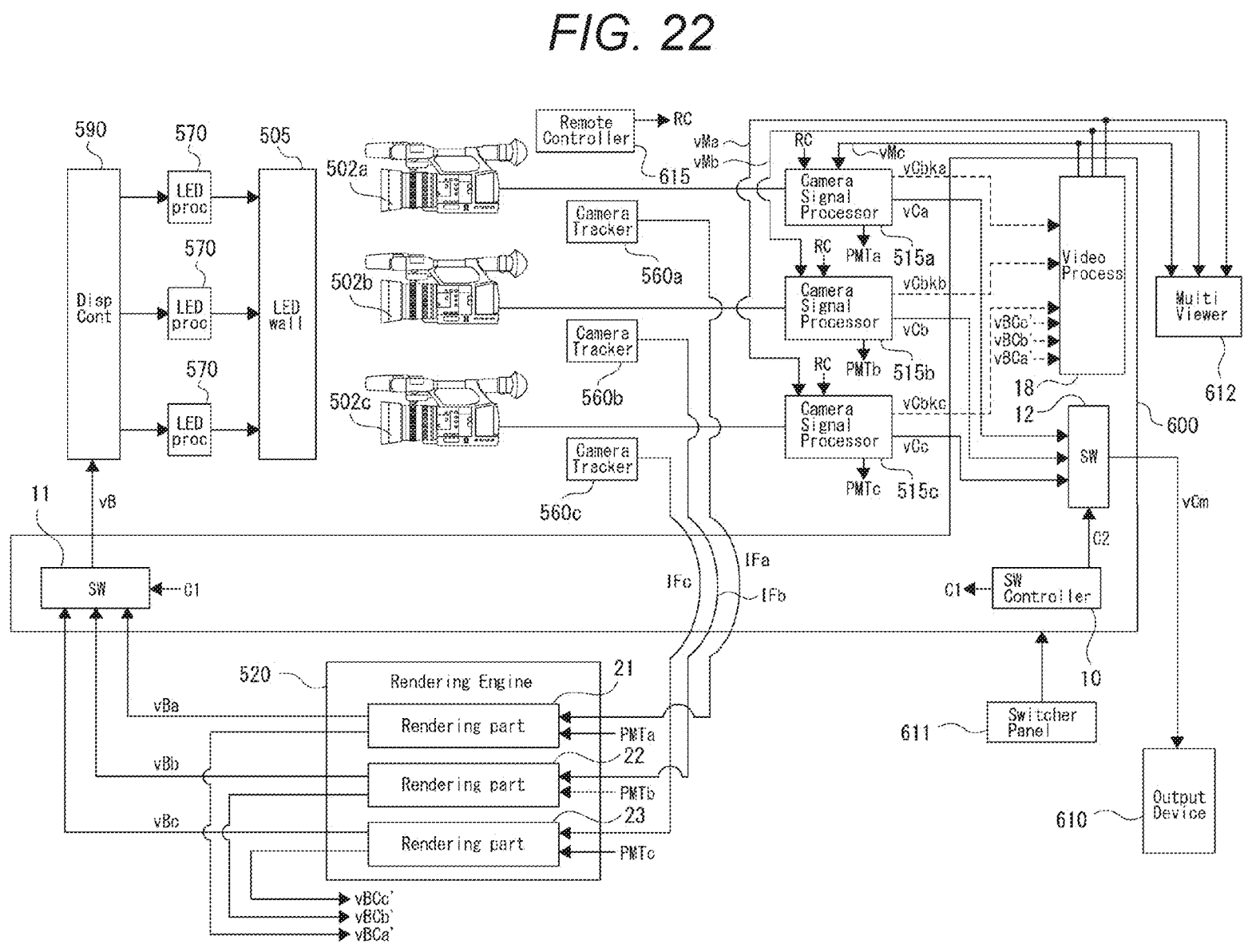

In particular, in the examples in FIGS. 13 and 22, a video processing unit 18 is provided in the switcher 600, but the video processing unit 18 includes the information processing device 70.

Figure 18:
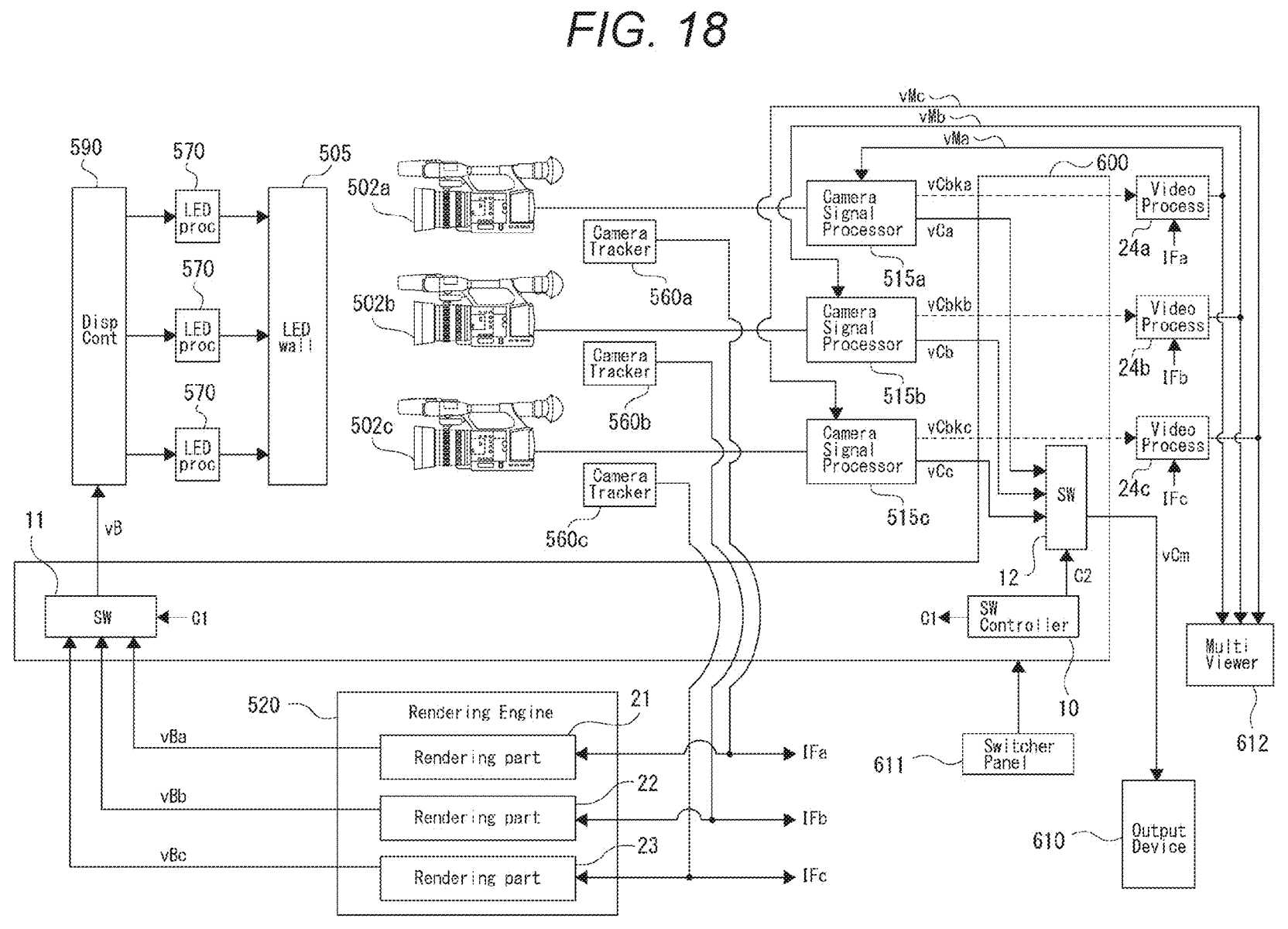
Figure 21:
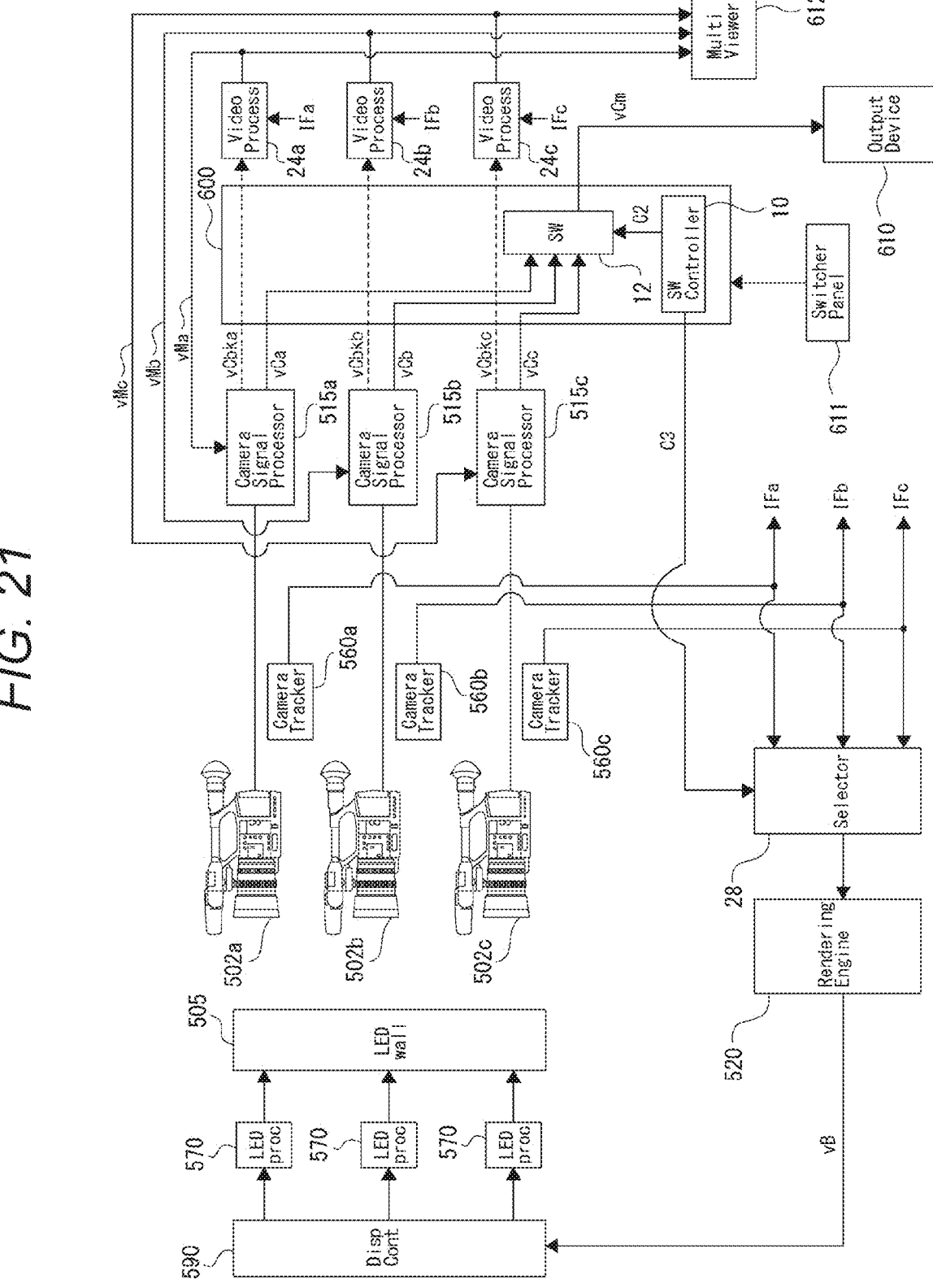
FIG. 21 is a block diagram of a configuration example of a third embodiment.
Figure 24:
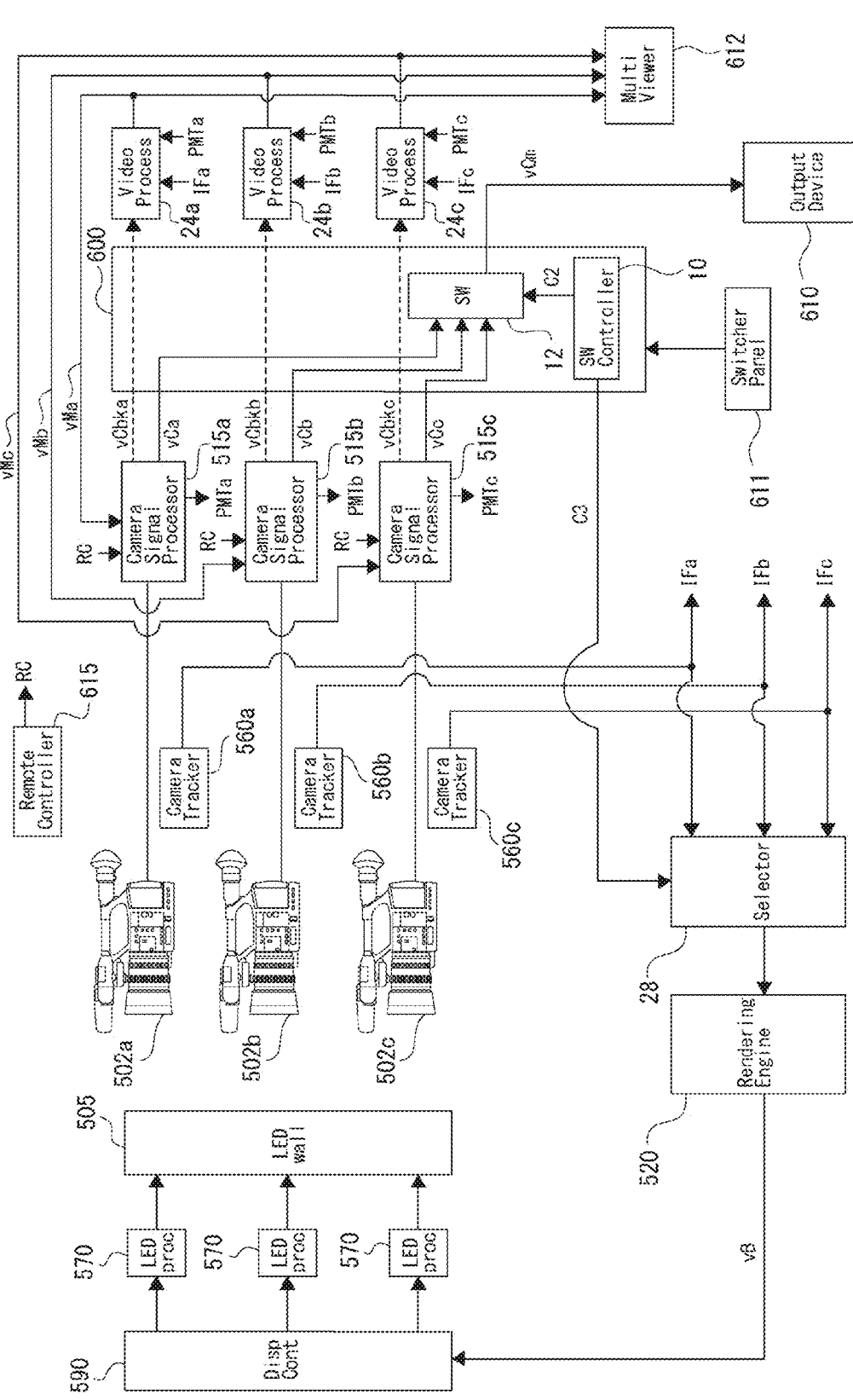
FIG. 24 is a block diagram of a configuration example of a fifth embodiment.

Furthermore, in the information processing device 70, a video processing unit 24 (24a, 24b, 24c) in FIGS. 18, 21, and 24 is a device that performs rendering like the rendering engine 520, but the video processing unit 24 can also include the information processing device 70.

Figure 8:
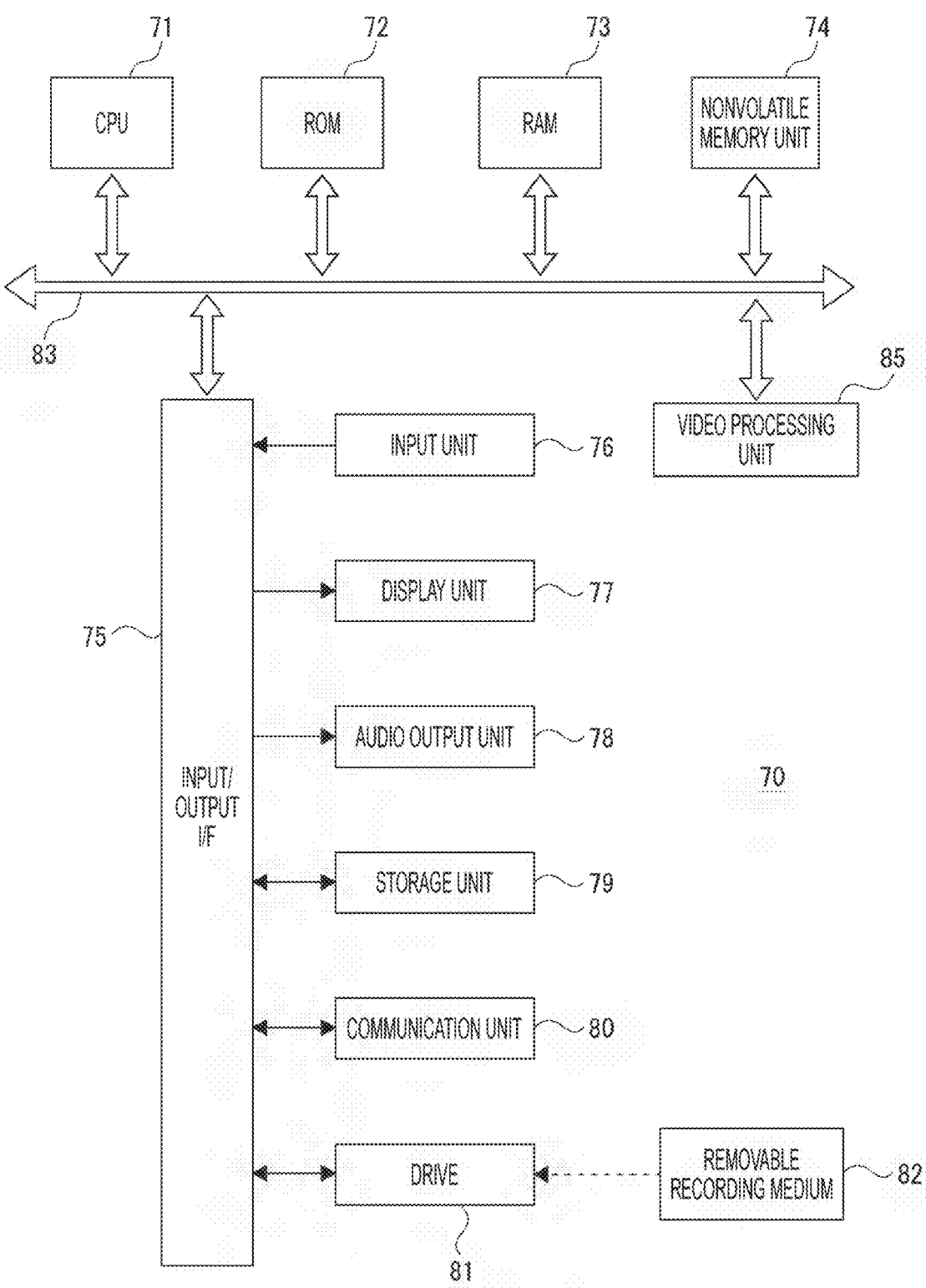
FIG. 8 is a block diagram of an information processing device of the embodiment.

A CPU 71 of the information processing device 70 illustrated in FIG. 8 executes various types of processing in accordance with a program stored in a nonvolatile memory unit 74 such as a ROM 72 or, for example, an electrically erasable programmable read-only memory (EEP-ROM), or a program loaded from a storage unit 79 to a RAM 73. The RAM 73 also appropriately stores data and the like necessary for the CPU 71 to execute various types of processing.

A video processing unit 85 is configured as a processor that performs various types of video processing. For example, the video processing unit 85 is a processor capable of performing any one of 3D model generation processing, rendering, DB processing, video editing processing, video analysis/detection processing, video processing such as video extraction and synthesis, and the like, or a plurality of types of processing.

The video processing unit 85 can be implemented by, for example, a CPU, a graphics processing unit (GPU), general-purpose computing on graphics processing units (GPGPU), an artificial intelligence (AI) processor, or the like that is separate from the CPU 71.

Note that the video processing unit 85 may be provided as a function in the CPU 71.

The CPU 71, the ROM 72, the RAM 73, the nonvolatile memory unit 74, and the video processing unit 85 are connected to one another via a bus 83. An input/output interface 75 is also connected to the bus 83.

An input unit 76 including an operator and an operation device is connected to the input/output interface 75. As the input unit 76, for example, various operation elements and operation devices including a keyboard, a mouse, a key, a dial, a touch panel, a touchpad, a remote controller, and the like are assumed.

A user operation is detected by the input unit 76, and a signal corresponding to the input operation is interpreted by the CPU 71.

A microphone is also assumed as the input unit 76. It is also possible to input voice uttered by the user as operation information.

Furthermore, a display unit 77 including a liquid crystal display (LCD), an organic electro-luminescence (EL) panel, or the like, and an audio output unit 78 including a speaker or the like are integrally or separately connected to the input/output interface 75.

The display unit 77 is a display unit that performs various displays, and includes, for example, a display device provided in the housing of the information processing device 70, a separate display device connected to the information processing device 70, and the like.

The display unit 77 displays various images, operation menus, icons, messages, and the like, that is, displays as a graphical user interface (GUI), on the display screen on the basis of the instruction from the CPU 71.

In some cases, the storage unit 79 including a hard disk drive (HDD), a solid-state memory, or the like or a communication unit 80 is connected to the input/output interface 75.

The storage unit 79 can store various pieces of data and programs. A DB can also be configured in the storage unit 79.

For example, in a case where the information processing device 70 functions as the asset server 530, a DB that stores a 3D background data group can be constructed using the storage unit 79.

The communication unit 80 performs communication processing via a transmission path such as the Internet, wired/wireless communication with various devices such as an external DB, an editing device, and an information processing device, bus communication, and the like.

For example, in a case where the information processing device 70 functions as the rendering engine 520 or the video processing unit 24 to be described later, the communication unit 80 can access the DB as the asset server 530, and receive imaging information from the camera 502 or the camera tracker 560.

Furthermore, also in a case of the information processing device 70 used in the post-production ST3, the communication unit 80 can access the DB as the asset server 530 or the like.

A drive 81 is also connected to the input/output interface 75 as necessary, and a removable recording medium 82 such as a magnetic disk, an optical disk, a magneto-optical disk, a semiconductor memory, or the like is appropriately mounted.

The drive 81 can read video data, various computer programs, and the like from the removable recording medium 82. The read data is stored in the storage unit 79, and video and audio included in the data are output by the display unit 77 and the audio output unit 78. Furthermore, the computer program and the like read from the removable recording medium 82 are installed in the storage unit 79, as necessary.

In the information processing device 70, for example, software for the processing of the present embodiment can be installed via network communication by the communication unit 80 or the removable recording medium 82. Alternatively, the software may be stored in advance in the ROM 72, the storage unit 79, or the like.

3. Imaging System Using a Plurality of Cameras and Switcher

In the embodiment, for example, a case where imaging is performed using a plurality of cameras 502 (502*a*, 502*b* . . . ) is assumed as described with reference to FIG. 7.

The captured videos vC of the plurality of systems obtained by capturing the LED wall 505, the performer 510, and the like by the plurality of cameras 502 are selectively switched by the switcher 600 described later, and are output as what is called a main line video. Note that, of course, each of the captured videos vC can be recorded or transmitted separately from the main line video.

Here, a situation occurring in a case where imaging is performed using two or more cameras 502 in virtual production will be described.

As described above, the background video vB captured by the camera 502 is not the entire background video vB displayed on the LED wall 505, but is the range of the capturing region video vBC (hereinafter also referred to as "inner frustum vBC").

Then, the video content of the inner frustum vBC is rendered by the rendering engine 520 according to the position and imaging direction of the camera 502 for each frame, incorporated into the entire body of the background video vB, and displayed on the LED wall 505. Therefore, the range and content of the inner frustum vBC of the background video vB are different according to the camera position and the like for each frame as described with reference to FIGS. 2 and 3. Furthermore, the inner frustum vBC is displayed corresponding to each camera 502.

That is, the inner frustum vBC is generated corresponding to each camera 502, and is an example of the corresponding video in the present disclosure.

Here, considering that imaging is performed by the two cameras 502*a* and 502*b*, the inner frustums vBCa and vBCb corresponding to the respective cameras 502*a* and 502*b* are displayed on the LED wall 505. Depending on the positions of the cameras 502*a* and 502*b*, the inner frustums vBCa and vBCb may overlap as illustrated in FIG. 9A.

Figure 9:
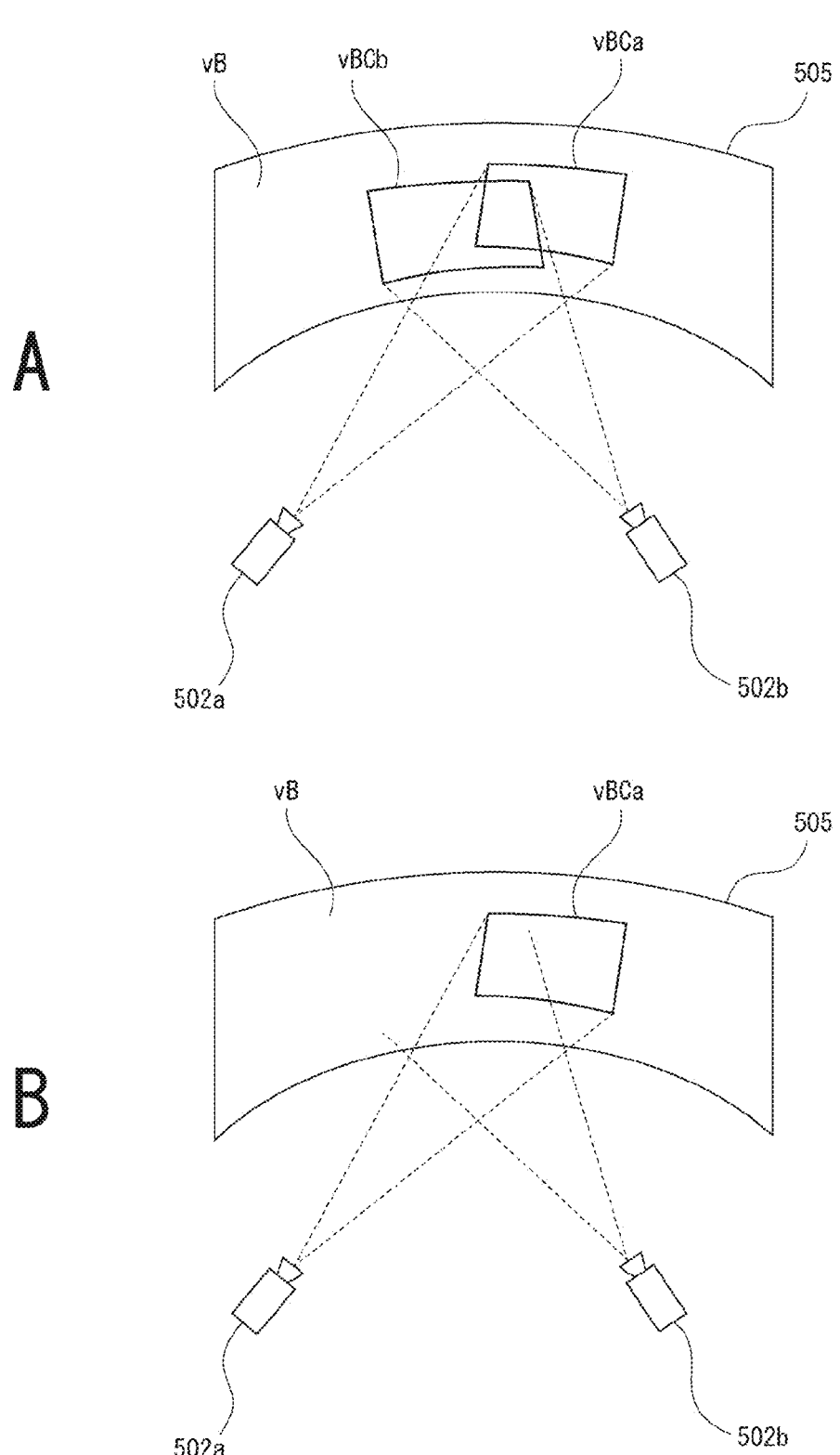
FIG. 9 is an explanatory diagram of overlapping of inner frustums for each camera.

If the inner frustums vBCa and vBCb do not overlap, the video vC captured by each of the cameras 502*a* and 502*b* is a video including an appropriate background. However, if the inner frustums vBCa and vBCb overlap as illustrated in FIG. 9, the video content of the background is not in a correct state.

Therefore, in a case where imaging is performed using the plurality of cameras 502, background videos vB of a plurality of systems including the respective inner frustums vBC are selectively displayed on the LED wall 505.

When the main line video is switched, the switching timing of the background video vB and the switching timing of the main line video are controlled so that the state in which the video vC captured by a certain camera 502 includes the background video vB of another camera 502 is not output as the main line video.

Figure 10:
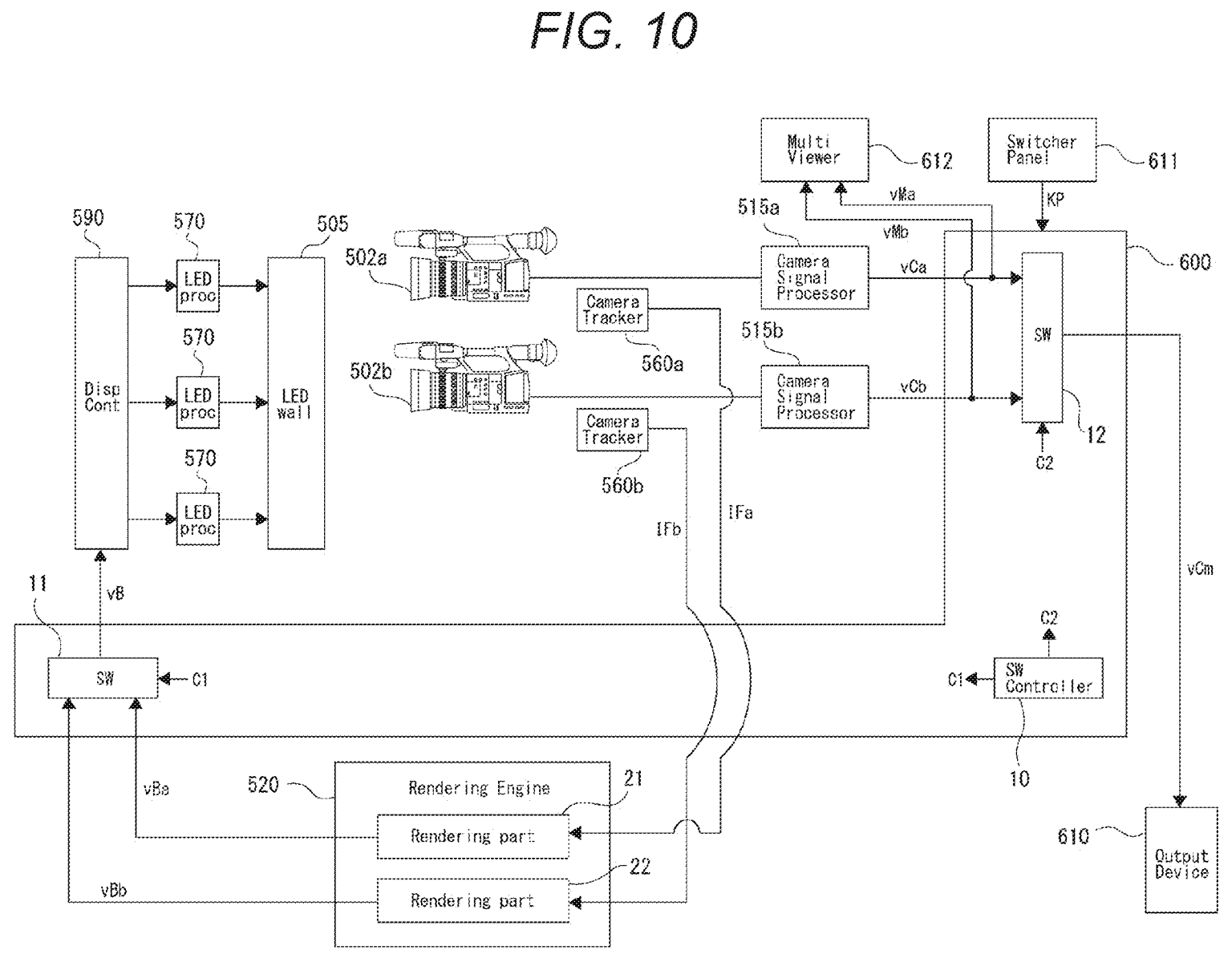

A configuration example for this is illustrated in FIG. 10. FIG. 10 is obtained by adding the switcher 600 and an output device 610 that switch the captured video vC on the premise of the configuration as illustrated in FIG. 7. The constituent parts described in FIG. 5 or FIG. 7 are denoted by the same reference numerals, and redundant description is avoided.

For the cameras 502*a* and 502*b*, camera signal processing units 515*a* and 515*b* that perform signal processing of captured video signals are illustrated. Although omitted in FIGS. 5 and 7, the camera signal processing units 515*a* and 515*b* may be formed by a processor or the like in the cameras 502*a* and 502*b*, or may be provided as a device of a separate unit from the cameras 502*a* and 502*b*.

The video signal captured by the camera 502*a* is subjected to development processing, resizing processing, and the like by the camera signal processing unit 515*a*, and is input to the switcher 600 as a captured video vCa. The video signal captured by the camera 502*b* is subjected to development processing, resizing processing, and the like by the camera signal processing unit 515*b*, and is input to the switcher 600 as a captured video vCb.

Furthermore, imaging information IFa and IFb including the camera positions, the imaging directions, and the like by the camera trackers 560*a* and 560*b* is supplied to the rendering engine 520. Although not illustrated, the angle of view, the focal length, the f-number, the shutter speed, the lens information, and the like of the cameras 502*a* and 502*b* are also included in the imaging information IFa and IFb and supplied to the rendering engine 520.

The rendering engine 520 includes one or a plurality of information processing devices 70. In this case, the rendering engine 520 is configured to have a plurality of rendering functions as rendering units 21 and 22, and is configured to be able to simultaneously execute rendering corresponding to at least the cameras 502*a* or 502*b*.

The rendering unit 21 performs rendering of the inner frustum vBCa corresponding to the camera 502*a* on the basis of the imaging information IFa regarding the camera 502*a*, incorporates the inner frustum vBCa into the entire background, and outputs the background video vBa matching the camera 502*a*.

Furthermore, the rendering unit 22 performs rendering of the inner frustum vBCb corresponding to the camera 502*b* on the basis of the imaging information IFb regarding the camera 502*b*, incorporates the inner frustum vBCb into the entire background, and outputs the background video vBb matching the camera 502*b*.

The switcher 600 is provided with a switch unit 11, and the switch unit 11 receives the background videos vBa and vBb as input, selects one of the background videos vBa and vBb, and outputs the selected video. The background video vBa or vBb selected by the switch unit 11 is the background video vB supplied to the LED wall 505.

As described above with reference to FIGS. 5 and 7, the background video vB is processed by the display controller 590 and distributed to the plurality of LED processors 570, and each LED panel 506 (not illustrated in FIG. 10) constituting the LED wall 505 is driven by the LED processor 570. As a result, the background video vB is displayed on the LED wall 505.

The cameras 502*a* and 502*b* capture the background video vB of the LED wall 505 and the performer 510.

As described above, the videos vCa and vCb captured by the cameras 502*a* and 502*b* are input to the switcher 600. The switcher 600 is provided with a switch unit 12 for inputting the captured videos vCa and vCb. The switch unit 12 selects one of the captured videos vCa and vCb, and outputs the selected video as a main line video vCm.

The main line video vCm is supplied to the output device 610.

Here, the output device 610 may be a recording device that records the main line video vCm on a recording medium, or may be a video transmission device that broadcasts and transmits the main line video vCm. Furthermore, the output device 610 may be a web server or the like that distributes the main line video vCm.

The switcher 600 includes the switch unit 11 that selects the background video vB and the switch unit 12 that selects the main line video vCm as described above, and includes a switcher controller (hereinafter referred to as "SW controller") 10 as a control unit that controls the switch units 11 and 12.

The SW controller 10 can be configured by the information processing device 70 as illustrated in FIG. 8. The SW controller 10 only needs to have a configuration including at least the CPU 71, the ROM 72, the RAM 73, the nonvolatile memory unit 74, and the input/output interface 75 in FIG. 8.

The SW controller 10 performs switching control of the switch units 11 and 12 according to the generation of a switching trigger KP. The SW controller 10 generates a control signal C1 to instruct switching of the switch unit 11. Furthermore, the SW controller 10 instructs switching of the switch unit 12 by the control signal C2.

The switching trigger KP is, for example, a trigger generated by the switching operation of the main line video vCm by the operator (the switching operation of the camera 502 for the main line video vCm).

For example, the operator can perform various operations including a switching operation of the main line video vCm using the switcher panel 611.

Note that not only the operation by the operator but also an automatic switching trigger KP may be generated. For example, it can be assumed that the switching trigger KP is generated by automatic switching control according to a predetermined sequence. Moreover, it can be also assumed that the switching trigger KP is generated by AI control for substituting for the operator.

FIG. 10 illustrates a multiviewer 612. The multiviewer 612 is a monitor device that displays the monitor video vM (vMa, vMb) of the captured video vC of each camera 502 in a divided manner in one screen, for example.

The operator or the like of the switcher 600 can check the captured content of each camera 502 by the multiviewer 612.

Figure 11:
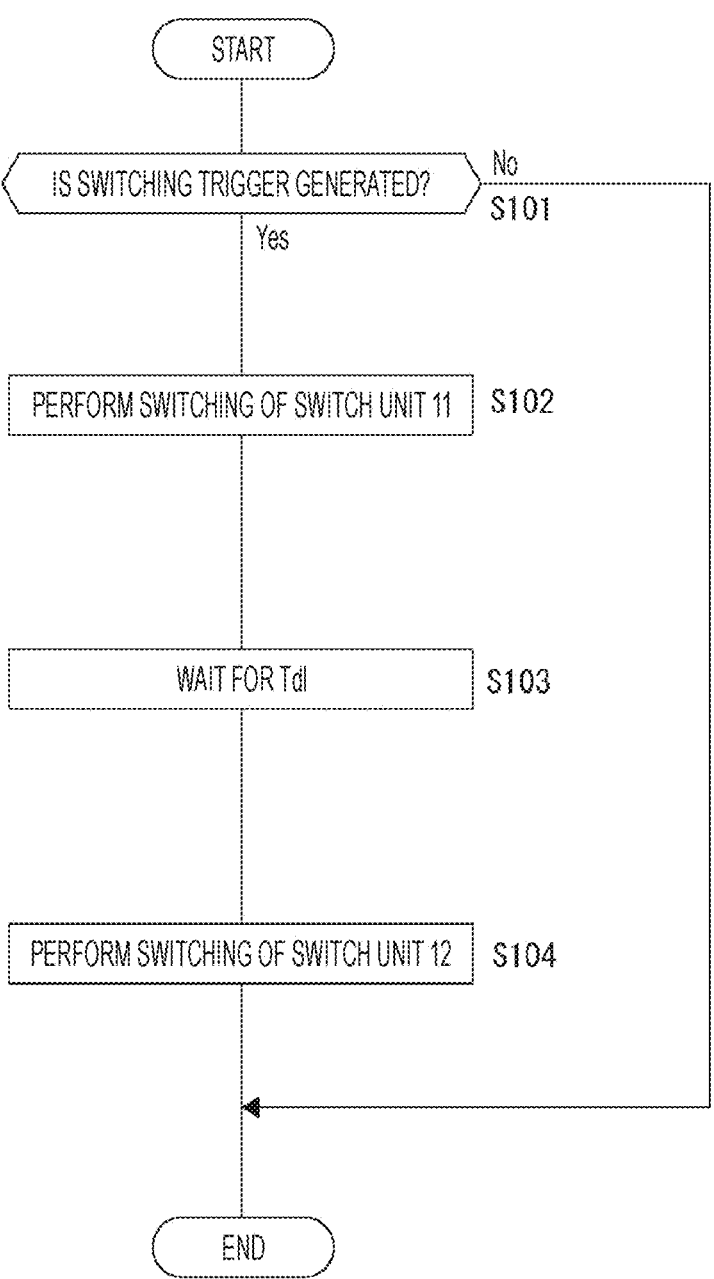
FIG. 11 is a flowchart of switching control by the switcher.

FIG. 11 illustrates the switching control of the switch units 11 and 12 by the SW controller 10.

When the switching trigger KP for the main line video vCm as described above is generated, the SW controller 10 proceeds from step S101 to step S102, and performs the switching control of the switch unit 11 by the control signal C1. That is, the switch unit 11 is immediately switched according to the generation of the switching trigger KP.

Subsequently, the SW controller 10 waits for a predetermined time set as a switching delay time Tdl in step S103.

When the time as the switching delay time Tdl elapsed, the SW controller 10 performs the switching control of the switch unit 12 by the control signal C2 in step S104. That is, in a case where the SW controller 10 causes the switch unit 11 to select the background video vBa in step S102, the SW controller 10 causes the switch unit 12 to select the captured video vCa in step S104. Similarly, in a case where the SW controller 10 causes the switch unit 11 to select the background video vBb in step S102, the SW controller 10 causes the switch unit 12 to select the captured video vCb in step S104.

As described above, the SW controller 10 first causes the switch unit 11 to execute switching in response to the switching trigger KP, and causes the switch unit 12 to execute switching after the switching delay time Tdl elapses.

The switching delay time Tdl will be described. For example, a case where the selected state is switched from the camera 502a to the camera 502b is assumed.

In this case, the switching delay time Tdl is a time corresponding to a time lag, for example, from when the background video vBb for the camera 502b is selected by the switch unit 11 to when the captured video vCb obtained by capturing the background video vBb by the camera 502b is input to the switch unit 12.

Even if the background video vBa is switched to the background video vBb by the switch unit 11, the display on the LED wall 505 is not switched to the background video vBb at that moment, and there is a delay until the display switching.

That is, as the setting of the operation mode on the LED panel 506 side (hereinafter also referred to as "LED-side operation mode"), there are a frame rate and various types of signal processing performed by the display controller 590 and the LED processor 570, so that a delay time until display switching occurs according to these LED-side operation modes. In terms of the signal processing, for example, the delay time from the switching of the switch unit 12 to the switching of the display differs depending on the resizing processing of the video according to the LED wall 505 (LED panel 506) side or the like.

Furthermore, the setting of the operation mode related to imaging by the camera is also related to the time lag. The operation mode related to imaging by the camera is an operation mode in the camera 502 or the camera signal processing unit 515. Hereinafter, the operation mode related to imaging by the camera is also referred to as a "camera-side operation mode". For example, a delay occurs due to a frame rate, a shutter speed, a reading region from the image sensor, processing contents of the camera signal processing unit 515, and the like as settings of the camera 502.

Figure 12:
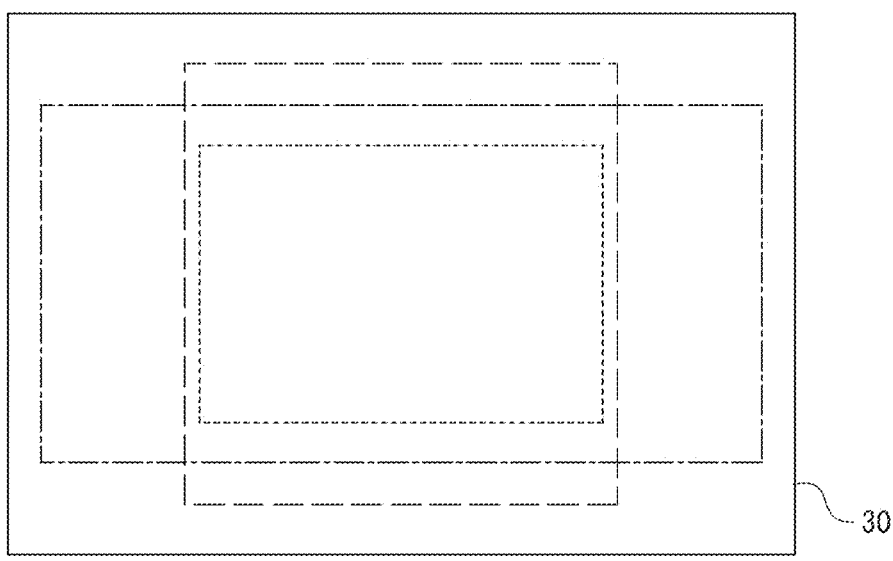
FIG. 12 is an explanatory diagram of an example of processing affecting a switching delay time.

For example, FIG. 12 illustrates an example of a reading range from an image sensor 30. It is assumed that a solid line indicates the entire pixel region of the image sensor 30. Reading of a photoelectric conversion signal from the image sensor 30 may be performed in the entire pixel region indicated by a solid line in some cases, or may be performed in various cases according to a reading mode, such as a range indicated by a dotted line, a range indicated by a broken line, and a range indicated by an alternate long and short dash line. The delay time varies according to the difference between these reading ranges. Furthermore, there is also a delay due to signal processing or resizing processing on the captured video vC.

By these camera-side operation modes, a time lag occurs from when the background video vBb displayed on the LED wall 505 is captured (exposed) by the camera 502b until the captured video vCb is input to the switch unit 12.

Therefore, the switching delay time Tdl is set according to the LED-side operation mode and the camera-side operation mode. As a result, in a case where the background video vBa is switched to the background video vBb for the camera 502b by the switch unit 11, for example, the switch unit 12 is switched at the timing when the captured video vCb obtained by capturing the background video vBb by the camera 502b is input to the switch unit 12, and the main line video vCm can be set to the video vCb captured by the camera 502b.

If the switching timing of the switch unit 12 is early, the captured video vCb captured by the camera 502b at the time when the background video vBa is displayed becomes the main line video vCm. This means that the video with the incorrect background is included in the main line video vCm. In order to avoid this, an appropriate switching delay time Tdl is set, and the switching timing is controlled as illustrated in FIG. 11.

With the above processing, it is possible to switch the camera 502 used for capturing the main line video vCm in the shortest time. In particular, during imaging, rendering of the background videos vBa and vBb is always executed by the rendering units 21 and 22, so that the background video vB of the switching destination can be immediately output from the switch unit 11 at the time of generation of the switching trigger KP. That is, there is no rendering delay.

Then, by switching the switch unit 12 at the timing when the background video vB after the switching is input to the switch unit 12, the main line video vCm does not become a video with incorrect background.

In FIG. 10, the case where imaging is performed by the two cameras 502a and 502b is exemplified, but when imaging is performed by three or more cameras 502, the process in FIG. 11 is similarly performed, so that a video with appropriate background can be set as the main line video vCm.

However, even in the above manner, the monitor video vM may not be correct.

For example, it is assumed that the camera 502a is selected as the main line video vCm. As illustrated in FIG. 9B, the background video vB including the inner frustum vBCa as the corresponding video of the camera 502a is displayed on the LED wall 505.

In this case, considering the camera 502b in the non-selected state, the inner frustum vBCb as the corresponding video of the camera 502b is not displayed. Therefore, the monitor video vM of the camera 502b viewed by the camera operator, the operator of the switcher 600, or the like is a video with an incorrect background.

For example, the inner frustum vBCa of the camera 502a is reflected in the captured video vCb of the camera 502b. Alternatively, even if the inner frustum vBCa is not reflected in the captured video vCb of the camera 502b, the monitor video vM is a video with a background that does not reflect the parallax corresponding to the position of the camera 502b.

The camera operator operates the camera 502 while monitoring the captured video of the camera by using a viewfinder, a monitor panel, or the like of the camera 502 operated by the camera operator. Then, as the operation of the camera operator, when the own camera 502 is not selected as the main line video vCm, the angle of view is often adjusted by a zoom operation, or the position and the imaging direction are often changed. At that time, it is inconvenient for the camera operator that the correct background cannot be visually recognized in the monitor video.

Furthermore, the operator or the like of the switcher 600 performs the switching operation while viewing the main line video vCm and the videos of the other cameras 502 by the multiviewer 612, for example. At this time, it is inconvenient that the videos of the cameras 502 other than the camera 502 being selected as the main line video vCm do not have correct backgrounds.

Therefore, in view of these circumstances regarding the monitor video vM, in the present embodiment, even in a case where only the inner frustum vBC of the camera 502 to be the main line video vCm is displayed on the LED wall 505, the monitor videos vM of the other cameras have correct backgrounds.

4. First Embodiment

FIG. 13 illustrates a system configuration example of a first embodiment. The same parts as those in FIGS. 5, 7, and 10 are denoted by the same reference numerals, and redundant description is avoided.

FIG. 13 illustrates a case where imaging is performed by the three cameras 502a, 502b, and 502c. In this case, the videos vCa, vCb, and vCc captured by the respective cameras 502 are input to the switch unit 12 of the switcher 600.

In response to imaging by the three cameras 502a, 502b, and 502c, in the rendering engine 520, the background videos vBa, vBb, and vBc are generated by the corresponding rendering units 21, 22, and 23, respectively. Then, the background videos vBa, vBb, and vBc are selected by the switch unit 11.

Also in this case, in a case where the switch unit 11 is switched by, for example, the process in FIG. 11, the SW controller 10 causes the switch unit 12 to execute switching after the switching delay time Tdl elapses.

In a case where the SW controller 10 causes the switch unit 11 to select the background video vBa in step S102, the SW controller 10 causes the switch unit 12 to select the captured video vCa in step S104. Similarly, in a case where the SW controller 10 causes the switch unit 11 to select the background video vBb in step S102, the SW controller 10 causes the switch unit 12 to select the captured video vCb in step S104. Similarly, in a case where the SW controller 10 causes the switch unit 11 to select the background video vBc in step S102, the SW controller 10 causes the switch unit 12 to select the captured video vCc in step S104.

In this manner, in step S104, the SW controller 10 performs control to cause the switch unit 12 to execute switching to the video vC captured by the camera 502 corresponding to the background video vB after the switching by the switch unit 11.

Note that, although, in FIGS. 10 and 13, the switch units 11 and 12 are configured in one switcher 600, a switcher having the switch unit 11 and a switcher having the switch unit 12 may be separate devices. In any configuration, the SW controller 10 provided in any switcher or in a separate device only needs to be able to control the switching timing of the switch units 11 and 12 by performing the control in FIG. 11.

In the example in FIG. 13, the video processing unit 18 is provided in the switcher 600 in addition to the configuration in FIG. 10. Note that, in this drawing, the video processing unit 18 is included in the switcher 600 as an example, but the video processing unit 18 may be configured as a device separate from the switcher 600.

Inner frustums vBCa, vBCb, and vBCc, which are the corresponding videos of the respective cameras 502a, 502b, and 502c, are input from the rendering units 21, 22, and 23 to the video processing unit 18.

The video processing unit 18 generates the monitor video vM (vMa, vMb, vMc) in accordance with the inputs of the inner frustums vBCa, vBCb, and vBCc, and outputs the monitor video vM to the multiviewer 612 and the camera signal processing units 515a, 515b, and 515c.

In the configuration in FIG. 13, the display of the background video vB and the operation of the camera 502 are as follows.

The outputs of the background videos vBa, vBb, and vBc by the rendering units 21, 22, and 23 are set to, for example, a frame rate of 60 frames (60 fps) per second.

On the other hand, the input background video vB (60 fps) and a black video also at 60 fps are alternately displayed at 120 fps on the LED wall 505. The black video is a video whose entire screen is black.

For example, the LED processor 570 repeats displaying the background video vB input from the switcher 600 on the LED panel 506 in a period of one frame at 120 fps, and subsequently displaying the internally generated black video on the LED panel 506 in a period of one frame at 120 fps.

Figure 14:
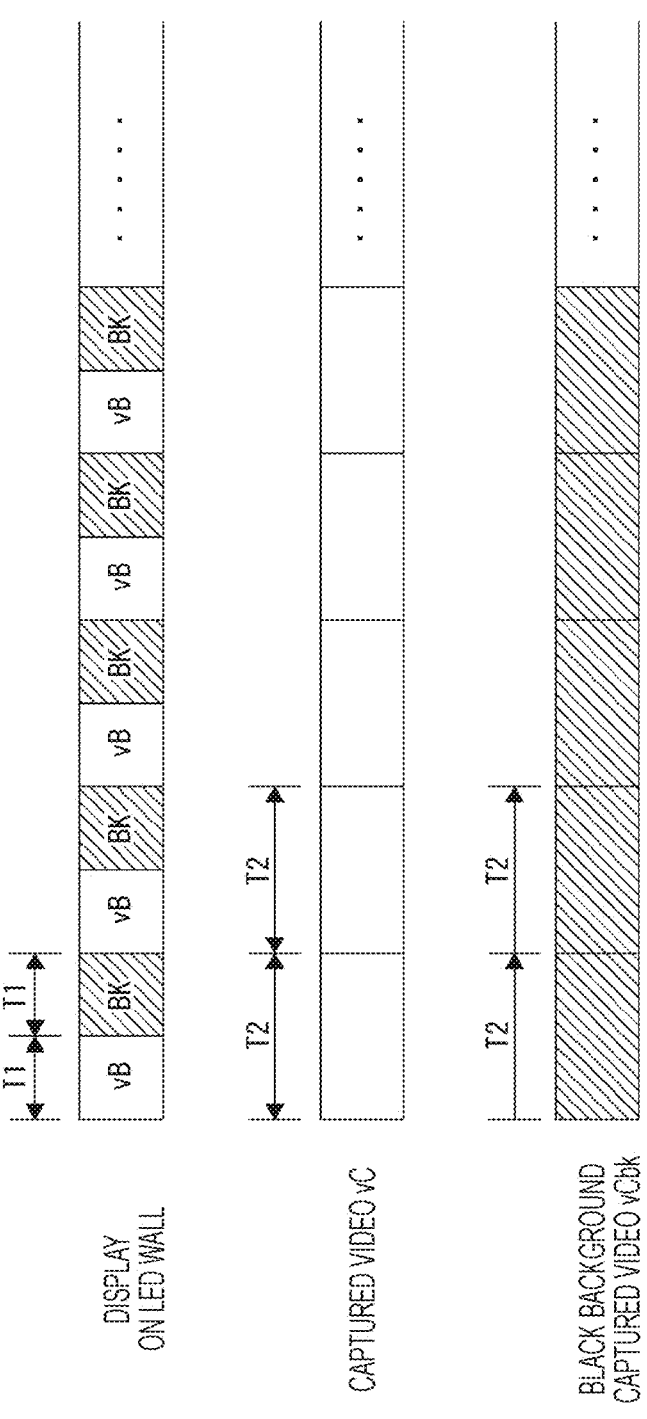
FIG. 14 is an explanatory diagram of a captured video and a black background captured video according to the embodiment.

As a result, as illustrated in FIG. 14, the background video vB and the black video BK are alternately displayed on LED wall 505 in a period T1 of one frame at 120 fps.

Each camera 502 synchronously captures the video on the LED wall 505 side at 120 fps.

As a result, the frame including the background video vB and the object such as the performer 510 and the frame including the black video BK and the object such as the performer 510 are alternately captured. In this case, the camera signal processing unit 515 (515a, 515b, 515c) separates the frames captured at 120 fps into an odd frame and an even frame, and outputs the frames in two systems.

In one system, as the captured video vC illustrated in FIG. 14, each frame is a continuous video in a period T2 of 60 fps. This is a video in which the inner frustum vBCa, the performer 510, and the like in the background video vB are shown.

In the other system, as the black background captured video vCbk, each frame is a continuous video in a period T2 of 60 fps. This is a video in which the black video BK, the performer 510, and the like are shown.

Therefore, as illustrated in FIG. 13, the captured video vCa and the black background captured video vCbka are output from the camera signal processing unit 515a. Similarly, the captured video vCb and the black background captured video vCbkb are output from the camera signal processing unit 515b, and the captured video vCc and the black background captured video vCbkc are output from the camera signal processing unit 515c.

The captured videos vCa, vCb, and vCc are input to the switch unit 12, and one is selected as the main line video vCm.

In this case, the captured video vC selected as the main line video vCm is a video with a correct background, but the other captured video vC is a video in which the background (inner frustum vBC) is incorrect, and thus is not used as the monitor video vM.

The black background captured videos vCbka, vCbka, and vCbkc are input to the video processing unit 18. The video processing unit 18 generates the monitor videos vMa, vMb, and vMc by using the black background captured videos vCbka, vCbkb, and vCbkc and the inner frustums vBCa, vBCb, and vBCc from the rendering units 21, 22, and 23 as described above.

Figure 15:
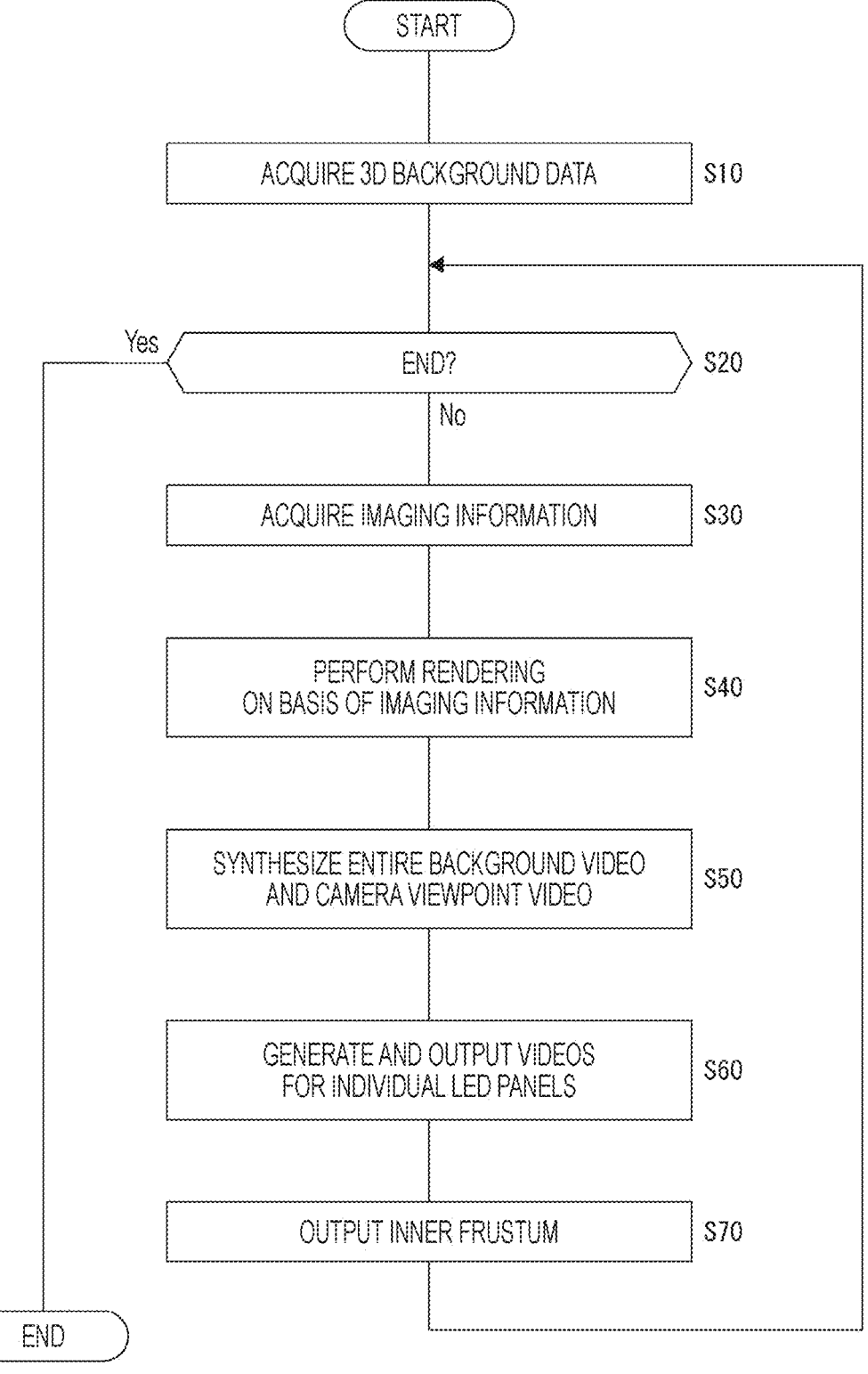
FIG. 15 is a flowchart of rendering processing of a background video of the first embodiment.

Each of the rendering units 21, 22, and 23 performs the process in FIG. 15 to output the inner frustums vBCa, vBCb, and vBCc.

Note that the process example in FIG. 15 is obtained by adding step S70 to the process described with reference to FIG. 6. The processing from step S10 to step S60 is similar to that in FIG. 6.

In step S70, the rendering units 21, 22, and 23 output the inner frustum vBC (vBCa, vBCb, vBCc).

That is, in step S70, the inner frustum vBC generated in step S40 is output in a state where the inner frustum vBC is not synthesized with the entire background video.

As described above, not the background videos vBa, vBb, and vBc but only the inner frustums vBCa, vBCb, and vBCc are input to the video processing unit 18 for each frame.

The reason why only the inner frustums vBCa, vBCb, and vBCc are input to the video processing unit 18 is that the background video within the angle of view captured by the camera 502 is only the portion of the inner frustum vBC.

Figure 16:
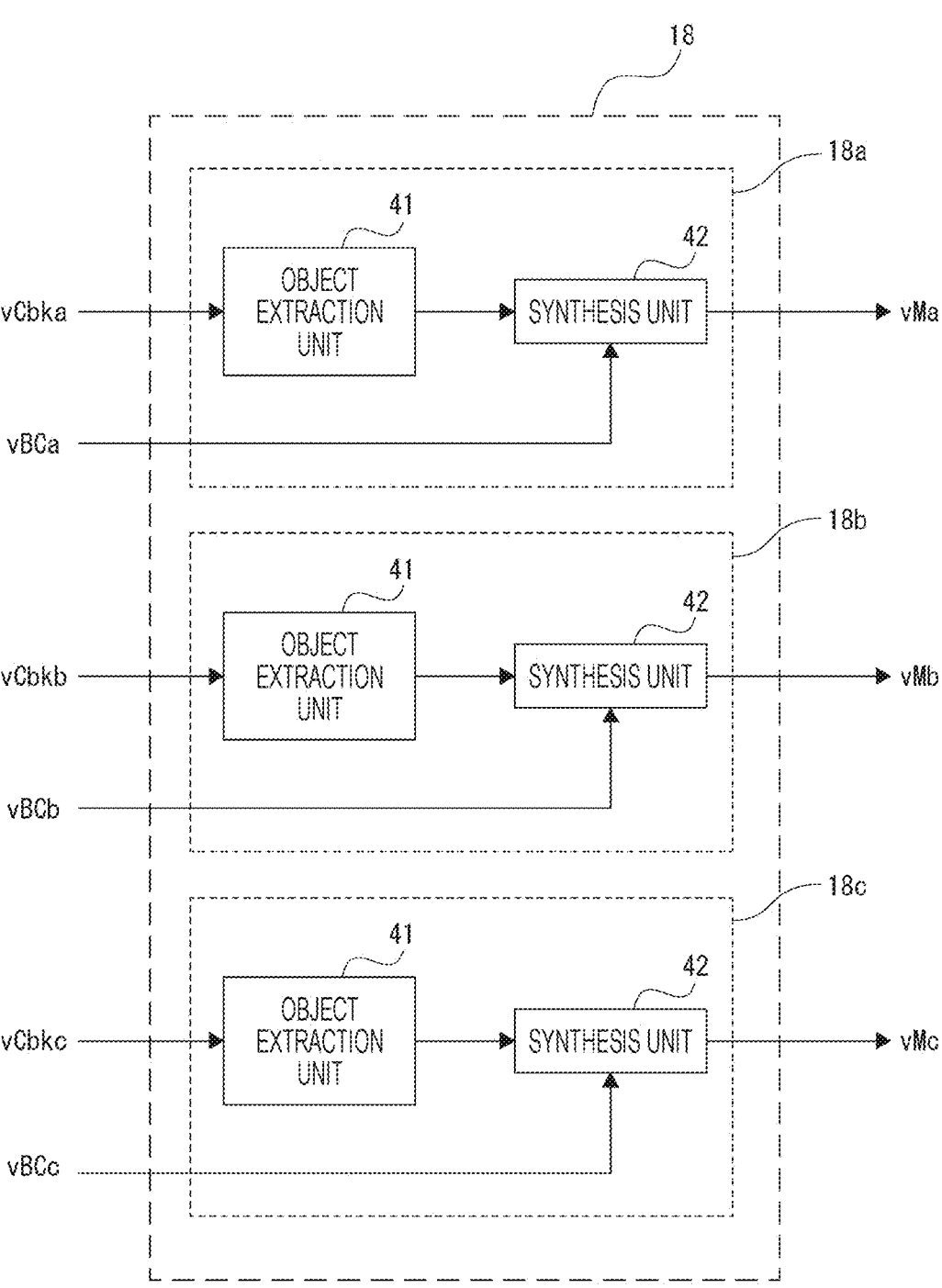
FIG. 16 is an explanatory diagram of a configuration of a video processing unit of the first embodiment.

The video processing unit 18 has a functional configuration as illustrated in FIG. 16.

The video processing unit 18 is provided with functions as video processing units 18a, 18b, and 18c in parallel in correspondence with the three cameras 502a, 502b, and 502c.

Each of the video processing units 18a, 18b, and 18c has a processing function as an object extraction unit 41 and a synthesis unit 42.

The black background captured video vCbka captured by the camera 502a and the inner frustum vBCa, which is the corresponding video of the camera 502a, are input to the video processing unit 18a.

The object extraction unit 41 extracts only the video of the object by removing the black video using the luminance key for the input black background captured video vCbka.

The synthesis unit 42 synthesizes the video of the extracted object and the input inner frustum vBCa. That is, processing of replacing the black video portion in the black background captured video vCbka with the inner frustum vBCa is performed.

Then, the output of the synthesis unit 42 is the monitor video vMa for the camera 502a.

Furthermore, the black background captured video vCbkb captured by the camera 502b and the inner frustum vBCb, which is the corresponding video of the camera 502b, are input to the video processing unit 18b.

The object extraction unit 41 extracts only the video of the object by removing the black video using the luminance key for the input black background captured video vCbkb.

The synthesis unit 42 synthesizes the video of the extracted object and the input inner frustum vBCb, and replaces the black video portion in the black background captured video vCbkb with the inner frustum vBCb. This output is the monitor video vMb for the camera 502b.

Furthermore, the black background captured video vCbkc captured by the camera 502c and the inner frustum vBCc, which is the corresponding video of the camera 502c, are input to the video processing unit 18c.

The object extraction unit 41 extracts only the video of the object by removing the black video using the luminance key for the input black background captured video vCbkc.

The synthesis unit 42 synthesizes the video of the extracted object and the input inner frustum vBCc, and replaces the black video portion in the black background captured video vCbkc with the inner frustum vBCc. This output is the monitor video vMc for the camera 502c.

Figure 17:
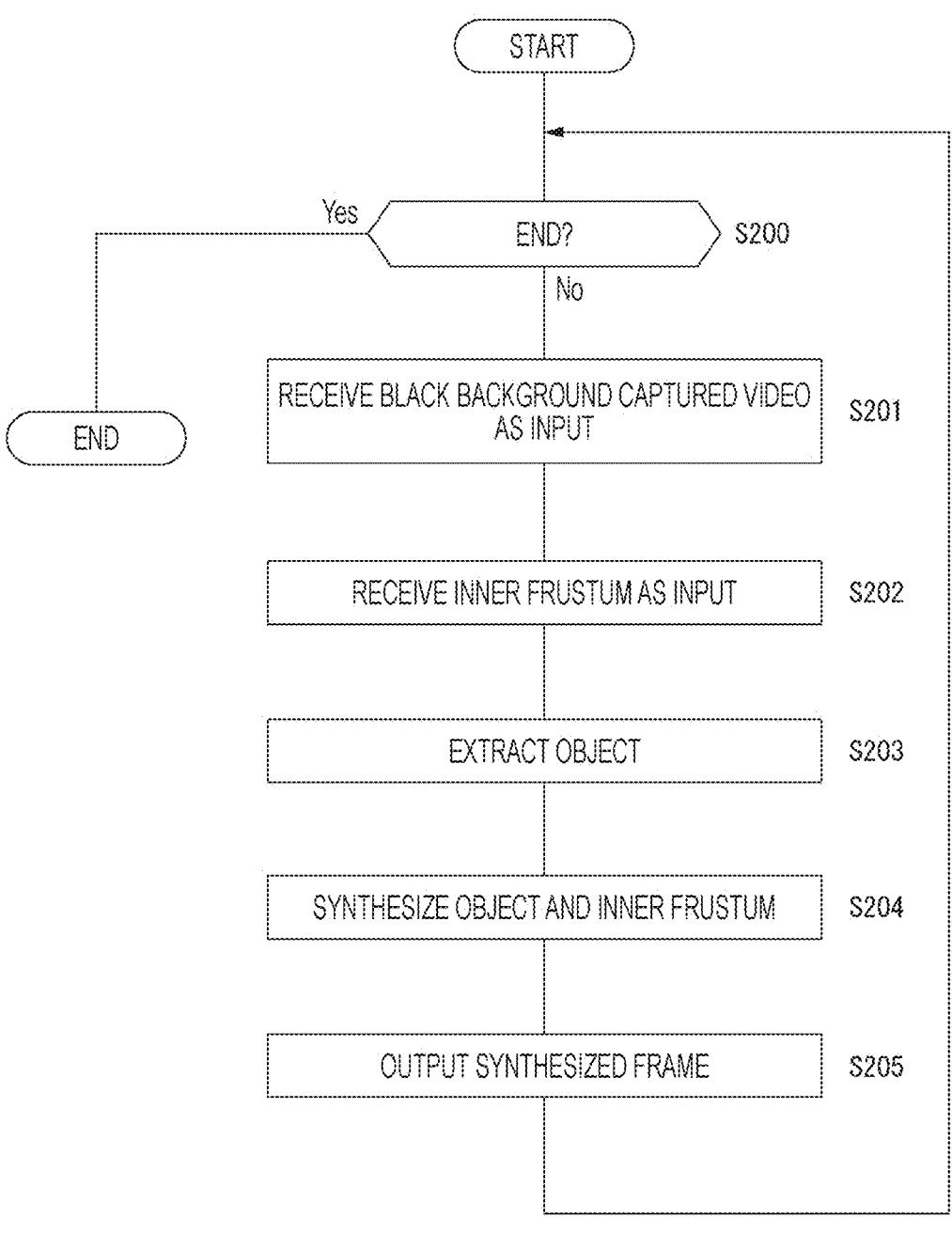
FIG. 17 is a flowchart of processing of the video processing unit of the first embodiment.

FIG. 17 is a flowchart illustrating processing of the video processing unit 18a, 18b, and 18c described above.

The video processing units 18a, 18b, and 18c repeat the processing from step S201 to step S205 for each frame timing until it is determined in step S200 that the monitor output is ended.

In step S201, the video processing unit 18 (18a, 18b, 18c) receives the black background captured video vCbk (vCbka, vCbkb, vCbkc) as input.

In step S202, the video processing unit 18 receives the inner frustum vBC (vBCa, vBCb, vBCc) as input.

In step S203, the video processing unit 18 extracts the video of the object from the black background captured video vCbk.

In step S204, the video processing unit 18 synthesizes the video of the object and the inner frustum vBC.

In step S205, the video processing unit 18 outputs the video in which the background is replaced by the synthesizing processing as the monitor video vM (vMa, vMb, vMc).

As illustrated in FIG. 13, the monitor videos vMa, vMb, and vMc are supplied to the multiviewer 612 and each displayed.

In the monitor videos vMa, vMb, and vMc, the background of the object such as the performer 510 is replaced with the inner frustum vBC corresponding to the captured camera 502. Therefore, the operator or the like can monitor the video with the correct background for each of the cameras 502a, 502b, and 502c.

Furthermore, the monitor videos vMa, vMb, and vMc are supplied to the camera signal processing units 515a, 515b, and 515c, respectively, are supplied from the camera signal processing units 515a, 515b, and 515c to the cameras 502a, 502b, and 502c, respectively, and are displayed on a viewfinder or the like.

Each of the camera operators who operate the cameras 502a, 502b, and 502c can view the video captured by his/her own camera not in an incorrect background state in which the video is actually captured but in a correct background state corresponding to the position and the imaging direction of the camera.

Note that, in the above example, the background video vB and the black video are alternately displayed on the LED wall 505, but the black video is a specific video used to perform the video processing of extracting the video of the object in the object extraction unit 41. That is, the black video is the specific video for separating the video of the object within one frame.

Such a specific video is not limited to a black video. For example, any video that can be used for video separation by chroma key may be used, and may be a green video with entire green, a blue video with entire blue, or the like.

Although video quality is improved by synthesizing the green video with the chroma key, when the green video or the blue video is displayed at a high frame rate in a time division manner, there is a possibility that a visual or psychological burden on the performer 510 increases due to blinking of the green video or the blue video. On the other hand, in the case of the black video, it is considered that such burden on the performer 510 can be reduced.

Note that, in a case where the black background captured video vCbk is used and the black is extracted by the luminance key, for example, the black hair of the performer 510 may also be removed, but the video processing unit 18 generates only the monitor video vM, which is not used for the main line video vCm, and thus it is considered that there is no big problem. In this regard, the specific video is preferably a black video.

The circumstances of the specific video described above are similar in second to fifth embodiments described below.

5. Second Embodiment

FIG. 18 illustrates a configuration example of the second embodiment.

The difference from the example in FIG. 13 is that the video processing unit 24 (24a, 24b, 24c) is provided separately from the switcher 600, and each of the video processing units 24a, 24b, and 24c has a rendering function.

As illustrated in FIG. 18, the black background captured videos vCbka, vCbkb, and vCbkc output from the camera signal processing units 515a, 515b, and 515c are input to the video processing units 24a, 24b, and 24c via the switcher 600, respectively.

Note that the black background captured videos vCbka, vCbkb, and vCbkc may be directly input to the video processing units 24a, 24b, and 24c without going through the switcher 600.

Furthermore, in FIG. 18, the imaging information IFa, IFb, and IFc supplied from the camera trackers 560a, 560b, and 560c to the rendering engine 520 are also supplied to the video processing units 24a, 24b, and 24c, respectively.

Figure 19:
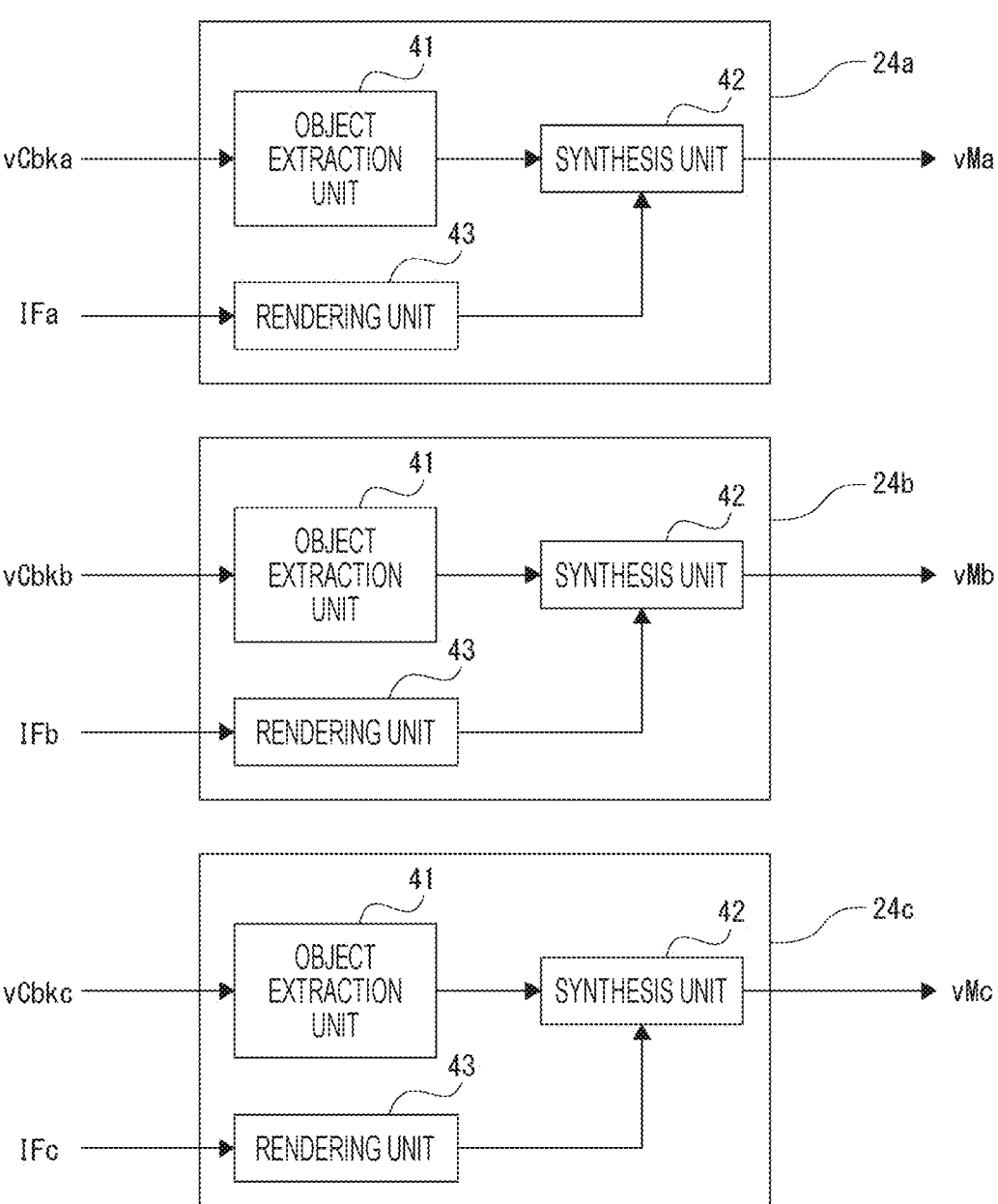
FIG. 19 is an explanatory diagram of a configuration of a video processing unit of the second embodiment.

FIG. 19 illustrates a functional configuration of the video processing unit 24a, 24b, and 24c.

The video processing units 24a, 24b, and 24c corresponding to the three cameras 502a, 502b, and 502c each have processing functions as the object extraction unit 41, the synthesis unit 42, and the rendering unit 43, respectively.

The object extraction unit 41 and the synthesis unit 42 are the functions described with reference to FIG. 16.

Similarly to the rendering units 21, 22, and 23 in the rendering engine 520, the rendering unit 43 has a rendering function of generating a video of the inner frustum vBC. However, the rendering unit 43 is different from the rendering units 21, 22, and 23 of the rendering engine 520 in that only generation of the inner frustum vBC is required, and synthesis with the background video around the inner frustum vBC is unnecessary.

The rendering unit 43 of the video processing unit 24a receives the imaging information IFa related to the camera 502a as input, and generates the inner frustum vBCa to be the corresponding video of the camera 502a as the background video of the viewpoint position based on the imaging information IFa.

Then, in the video processing unit 24a, the synthesis unit 42 synthesizes the video of the object extracted by the object extraction unit 41 and the inner frustum vBCa. That is, the black video portion in the black background captured video vCbka is replaced with the inner frustum vBCa. Then, the output of the synthesis unit 42 is the monitor video vMa for the camera 502a.

The rendering unit 43 of the video processing unit 24b receives the imaging information IFb related to the camera 502b as input, and generates the inner frustum vBCb to be the corresponding video of the camera 502b as the background video of the viewpoint position based on the imaging information IFb.

Then, in the video processing unit 24b, the synthesis unit 42 synthesizes the video of the object extracted by the object extraction unit 41 and the inner frustum vBCb, and replaces the black video portion in the black background captured video vCbkb with the inner frustum vBCb. The output of the synthesis unit 42 is the monitor video vMb for the camera 502b.

The rendering unit 43 of the video processing unit 24c receives the imaging information IFc related to the camera 502c as input, and generates the inner frustum vBCc to be the corresponding video of the camera 502c as the background video of the viewpoint position based on the imaging information IFc.

Then, in the video processing unit 24c, the synthesis unit 42 synthesizes the video of the object extracted by the object extraction unit 41 and the inner frustum vBCc, and replaces the black video portion in the black background captured video vCbkc with the inner frustum vBCc. The output of the synthesis unit 42 is the monitor video vMc for the camera 502c.

Figure 20:
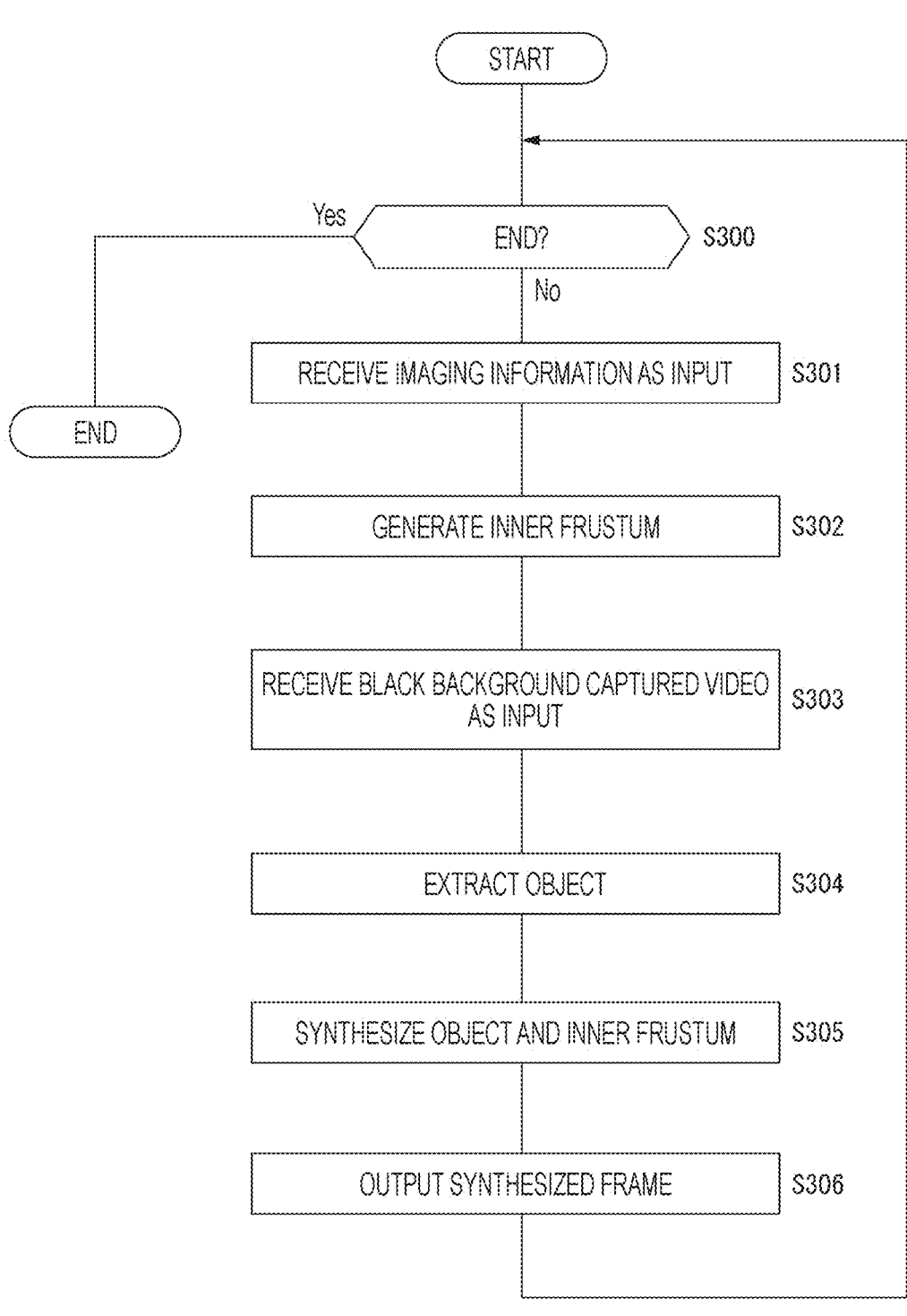
FIG. 20 is a flowchart of processing of the video processing unit of the second embodiment.

FIG. 20 is a flowchart illustrating processing of the video processing unit 24a, 24b, and 24c described above.

The video processing units 24a, 24b, and 24c repeat the processing from step S301 to step S306 for each frame timing until it is determined in step S300 that the monitor output is ended.

In step S301, the video processing unit 24 (24a, 24b, 24c) receives the imaging information IF (IFa, IFb, IFc) as input.

In step S302, the video processing unit 24 generates the inner frustum vBC (vBCa, vBCb, vBCc) on the basis of the imaging information IF.

In step S303, the video processing unit 24 receives the black background captured video vCbk (vCbka, vCbkb, vCbkc) as input.

In step S304, the video processing unit 24 extracts the video of the object from the black background captured video vCbk.

In step S305, the video processing unit 24 synthesizes the video of the object and the inner frustum vBC generated by the rendering unit 43.

In step S306, the video processing unit 24 outputs the video in which the background is replaced by the synthesizing processing as the monitor video vM (vMa, vMb, vMc).

As illustrated in FIG. 18, the monitor videos vMa, vMb, and vMc are supplied to the multiviewer 612 and each displayed.

Furthermore, the monitor videos vMa, vMb, and vMc are supplied to the camera signal processing units 515a, 515b, and 515c, respectively, are supplied from the camera signal processing units 515a, 515b, and 515c to the cameras 502a, 502b, and 502c, respectively, and are displayed on a viewfinder or the like. Note that the monitor videos vMa, vMb, and vMc may be supplied to the camera signal processing units 515a, 515b, and 515c via the switcher 600.

As described above, the operator and the camera operator of each camera 502 can monitor the video with the correct background.

6. Third Embodiment

FIG. 21 illustrates a configuration example of the third embodiment.

This is a configuration in which the rendering engine 520 renders only the background video vB of the camera 502 selected as the main line video vCm among the plurality of cameras 502.

The imaging information IFa, IFb, and IFc from the camera trackers 560a, 560b, and 560c are selectively supplied to the rendering engine 520 via a selector 28. The selector 28 selects one piece of the imaging information IFa, IFb, and IFc by a control signal C3 from the SW controller 10 of the switcher 600, and supplies the selected imaging information to the rendering engine 520.

The rendering engine 520 generates the inner frustum vBC on the basis of the input imaging information IF, generates the background video vB including the inner frustum vBC, and outputs the background video vB to the display controller 590.

The switcher 600 in this example includes a switch unit 12 and a SW controller 10.

The SW controller 10 performs switching control of the selector 28 according to the selection of the main line video vCm by the switch unit 12. That is, the SW controller 10 causes the selector 28 to select the imaging information IFa during the period in which the switch unit 12 selects the captured video vCa of the camera 502a as the main line video vCm. Similarly, the SW controller 10 causes the selector 28 to select the imaging information IFb in a period in which the captured video vCb of the camera 502b is selected as the main line video vCm, and causes the selector 28 to select the imaging information IFc in a period in which the captured video vCc of the camera 502c is selected as the main line video vCm.

As a result, the main line video vCm becomes a video with a correct background regardless of which camera 502 is selected. Furthermore, since the rendering engine 520 only needs to synthesize the inner frustum vBC corresponding to one camera 502, a processing load is small compared with that of the configuration in FIG. 18, for example.

Also in such a configuration of FIG. 21, similarly to FIG. 18, the imaging information IFa, IFb, and IFc from the camera trackers 560a, 560b, and 560c are also supplied to the video processing units 24a, 24b, and 24c. The functional configuration and processing of the video processing units 24a, 24b, and 24c are similar to those in FIGS. 19 and 20.

As a result, the monitor videos vMa, vMb, and vMc corresponding to the three cameras 502a, 502b, and 502c are generated and supplied to the multiviewer 612. Furthermore, the monitor videos vMa, vMb, and vMc are supplied to the cameras 502a, 502b, and 502c via the camera signal processing units 515a, 515b, and 515c, and displayed on a viewfinder or the like.

As described above, the operator and the camera operator of each camera 502 can monitor the video with the correct background.

7. Fourth Embodiment

FIG. 22 illustrates a configuration example of the fourth embodiment. The configuration example in FIG. 22 is similar to the configuration example in FIG. 13, but processing of the rendering units 21, 22, and 23 in the rendering engine 520 is different.

The imaging information IFa, IFb, and IFc are input to the rendering units 21, 22, and 23, respectively, and parameters PMTa, PMTb, and PMTc are input from the camera signal processing units 515a, 515b, and 515c, respectively.

The parameter PMT (PMTa, PMTb, PMTc) mentioned herein is a parameter related to the video of the camera, and in particular, is a parameter that affects the luminance and color as the video. Specific examples thereof include values such as exposure and white balance with which a camera operator performs an operation. Alternatively, the parameter may be an adjustment of a color tone (color tone), a value of a video effect, or the like.

In the case of the first embodiment in FIG. 13, the monitor videos vMa, vMb, and vMc are obtained by synthesizing the inner frustums vBCa, vBCb, and vBCc by the video processing unit 18, but the inner frustums vBCa, vBCb, and vBCc are videos in which exposure adjustment and white balance adjustment in the cameras 502a, 502b, and 502c are not reflected. Therefore, even if the camera operator performs adjustment operation of the exposure or the white balance with the camera 502, the adjustment is not reflected in the background portions of the monitor videos vMa, vMb, and vMc. Furthermore, therefore, the brightness and color tone of the background portion and the object portion may be different in the monitor videos vMa, vMb, and vMc. For these reasons, it is inconvenient for the camera operator to operate exposure adjustment and white balance adjustment.

Therefore, in the fourth embodiment, in order to reflect the operation of the camera operator in the monitor video vM, the parameters PMTa, PMTb, and PMTc are supplied to the rendering units 21, 22, and 23. Then, the rendering units 21, 22, and 23 perform process as illustrated in FIG. 23.

Figure 23:
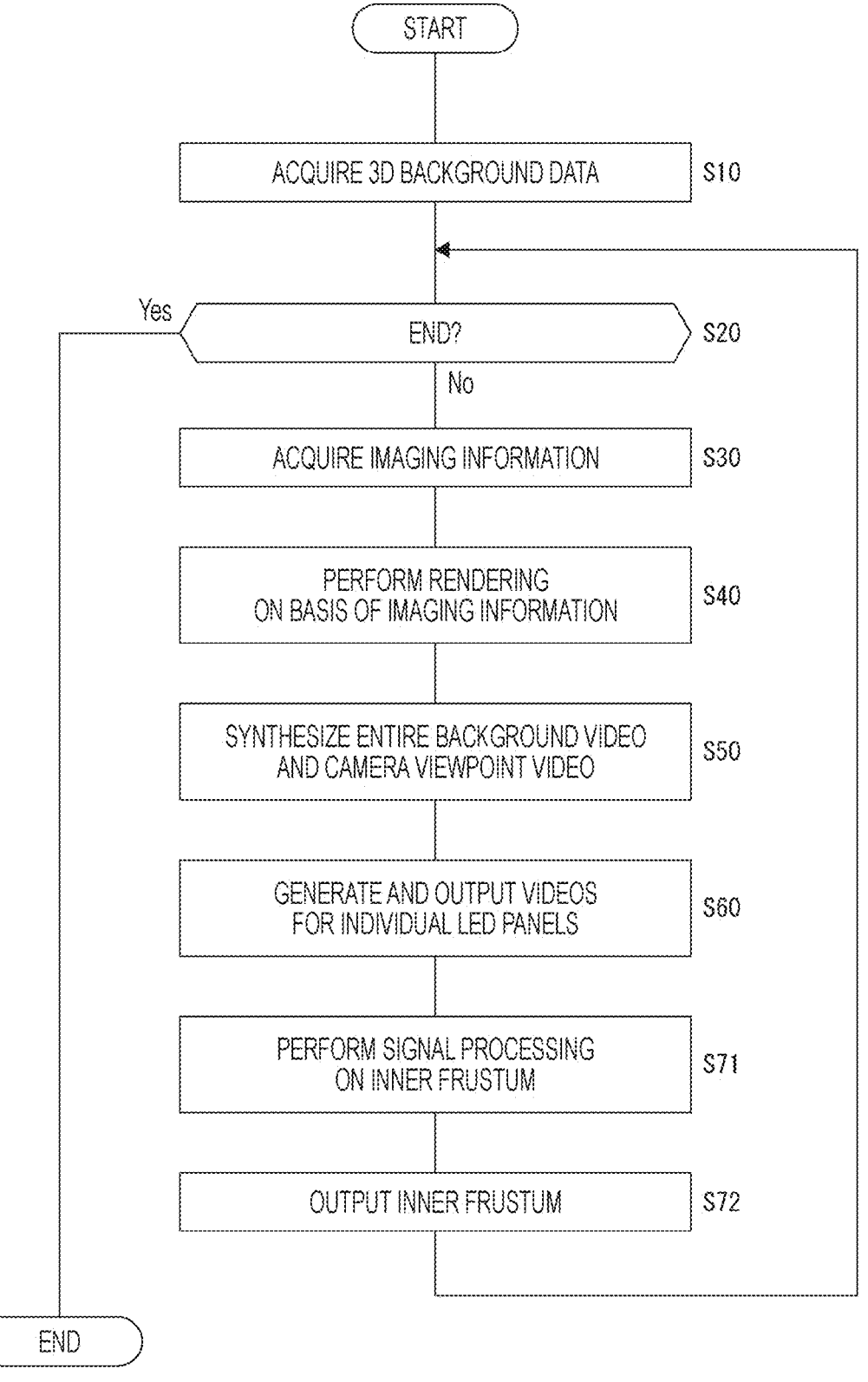
FIG. 23 is a flowchart of processing of a video processing unit of the fourth embodiment.

The process example in FIG. 23 is obtained by adding steps S71 and S72 to the process described with reference to FIG. 6. The processing from step S10 to step S60 is similar to that in FIG. 6.

In step S71, the rendering units 21, 22, and 23 perform signal processing using the parameters PMTa, PMTb, and PMTc on the inner frustum vBC (vBCa, vBCb, vBCc) generated in step S40. That is, processing is performed to obtain a video in a state in which the exposure and the white balance are adjusted.

Then, in step S72, the rendering units 21, 22, and 23 output the inner frustum vBC' subjected to the signal processing in step S71.

As described above, in addition to the background videos vBa, vBb, and vBc, the inner frustums vBCa', vBCb', and vBCc' subjected to the video signal processing reflecting the parameters PMTa, PMTb, and PMTc are output from the rendering units 21, 22, and 23, respectively.

Note that the background videos vBa, vBb, and vBc supplied to the LED wall 505 are not subjected to the video processing reflecting the parameters PMTa, PMTb, and PMTc. This is because the exposure and the white balance adjusted at the time of imaging by the camera 502 are then reflected.

The video processing unit 18 performs the processing described with reference to FIG. 17 with the functional configuration described with reference to FIG. 16. However, the inner frustums vBCa', vBCb', and vBCc' subjected to the video processing reflecting the parameters PMTa, PMTb, and PMTc are input.

Therefore, the generated monitor videos vMa, vMb, and vMc are background videos reflecting the exposure and the white balance adjusted by the camera operator. As a result, the monitor videos vMa, vMb, and vMc become more appropriate videos.

Note that FIG. 22 illustrates a remote controller 615, and outputs an operation signal RC to, for example, the camera signal processing units 515a, 515b, and 515c. The camera operator, the operator, or the like can perform exposure adjustment, white balance adjustment, color tone adjustment, video effect, and the like by operating the camera 502 itself or by using the remote controller 615.

In such a case, it is preferable that the processing of the rendering engine 520 is performed by the parameter PMT corresponding to the operation.

8. Fifth Embodiment

FIG. 24 illustrates a configuration example of the fifth embodiment. This is similar to the configuration example in FIG. 21, and an example in which the parameters PMTa, PMTb, and PMTc are reflected in the video processing units 24a, 24b, and 24c.

In the case of FIG. 24, the parameters PMTa, PMTb, and PMTc from the camera signal processing units 515a, 515b, and 515c are input to the video processing units 24a, 24b, and 24c, respectively.

Figure 25:
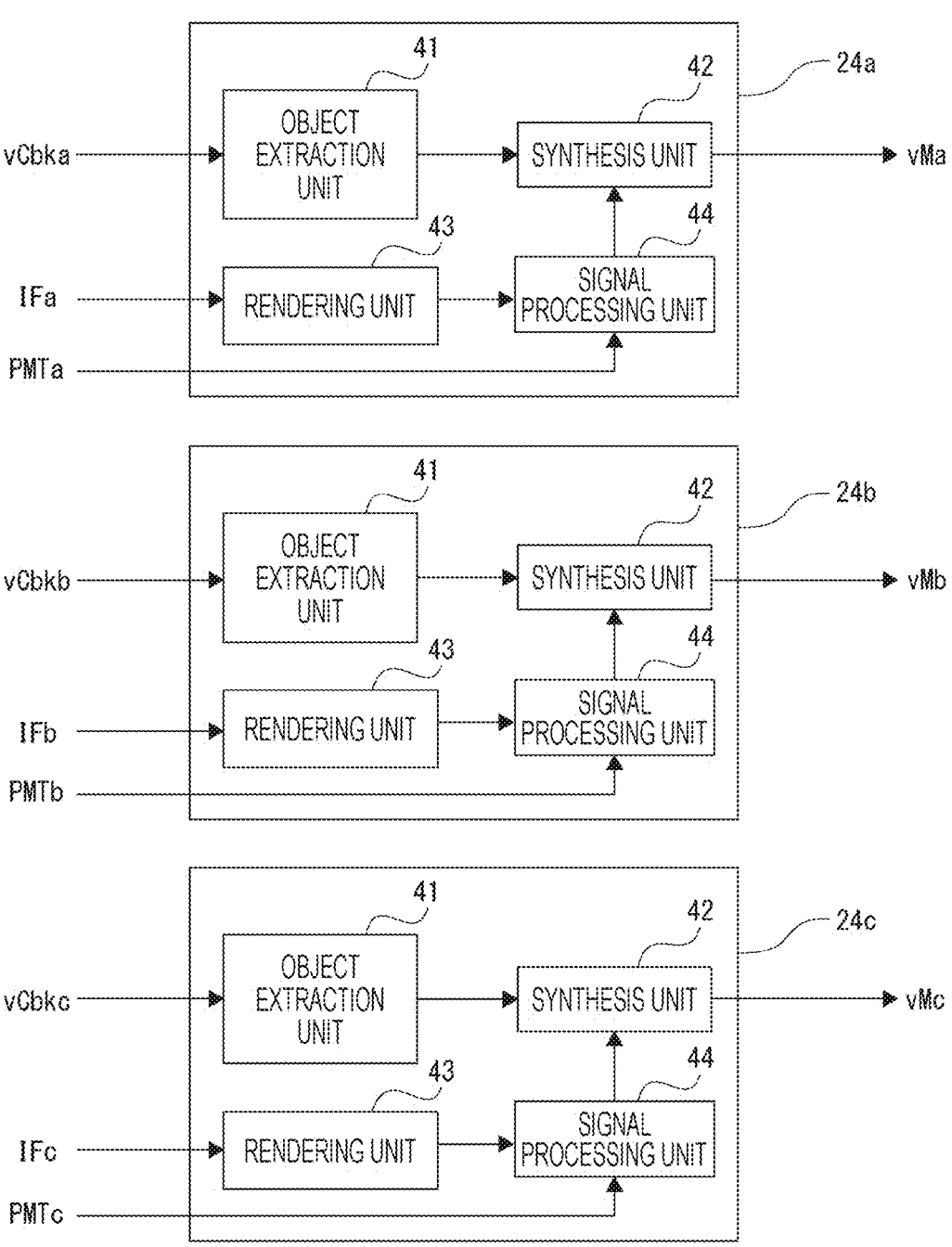
FIG. 25 is an explanatory diagram of a configuration of a video processing unit of the fifth embodiment.

FIG. 25 illustrates a functional configuration of the video processing unit 24a, 24b, and 24c.

The video processing units 24a, 24b, and 24c corresponding to the three cameras 502a, 502b, and 502c each have processing functions as the object extraction unit 41, the synthesis unit 42, the rendering unit 43, and a signal processing unit 44, respectively.

The object extraction unit 41, the synthesis unit 42, and the rendering unit 43 are the functions described with reference to FIG. 19.

The signal processing unit 44 performs signal processing according to the parameter PMT on the inner frustum vBC generated by the rendering unit 43.

The rendering unit 43 of the video processing unit 24a receives the imaging information IFa related to the camera 502a as input, and generates the inner frustum vBCa to be the corresponding video of the camera 502a as the background video of the viewpoint position based on the imaging information IFa. For the inner frustum vBCa, the signal processing unit 44 performs signal processing according to the parameter PMTa, and the inner frustum vBCa' is supplied to the synthesis unit 42. Then, the video of the object extracted by the object extraction unit 41 and the inner frustum vBCa' are synthesized by the synthesis unit 42 and output as the monitor video vMa for the camera 502a.

The rendering unit 43 of the video processing unit 24b receives the imaging information IFb related to the camera 502b as input, and generates the inner frustum vBCb to be the corresponding video of the camera 502b as the background video of the viewpoint position based on the imaging information IFb. For the inner frustum vBCb, the signal processing unit 44 performs signal processing according to the parameter PMTb, and the inner frustum vBCb' is supplied to the synthesis unit 42. Then, the video of the object extracted by the object extraction unit 41 and the inner frustum vBCb' are synthesized by the synthesis unit 42 and output as the monitor video vMb for the camera 502a.

The rendering unit 43 of the video processing unit 24c receives the imaging information IFc related to the camera 502c as input, and generates the inner frustum vBCc to be the corresponding video of the camera 502c as the background video of the viewpoint position based on the imaging information IFc. For the inner frustum vBCc, the signal processing unit 44 performs signal processing according to the parameter PMTc, and the inner frustum vBCc' is supplied to the synthesis unit 42. Then, the video of the object extracted by the object extraction unit 41 and the inner frustum vBCc' are synthesized by the synthesis unit 42 and output as the monitor video vMc for the camera 502c.

Figure 26:
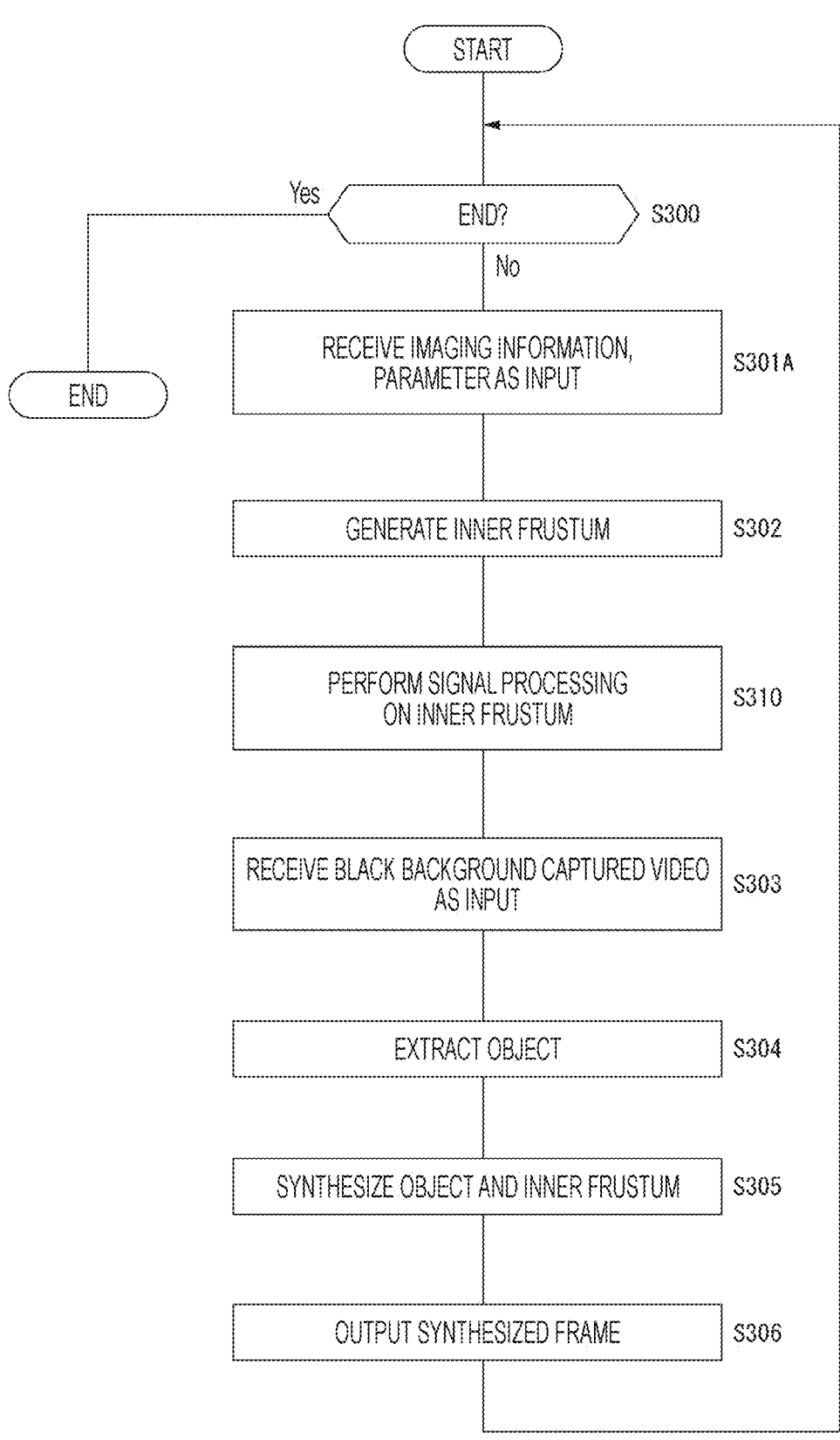
FIG. 26 is a flowchart of processing of the video processing unit of the fifth embodiment.

FIG. 26 is a flowchart illustrating processing of the video processing unit 24a, 24b, and 24c described above.

The video processing units 24a, 24b, and 24c repeat the processing from step S301A to step S306 for each frame timing until it is determined in step S300 that the monitor output is ended.

In step S301A, the video processing unit 24 (24a, 24b, 24c) receives the imaging information IF (IFa, IFb, IFc) and the parameter PMT (PMTa, PMTb, PMTc) as input.

In step S302, the video processing unit 24 generates the inner frustum vBC (vBCa, vBCb, vBCc) on the basis of the imaging information IF.

In step S310, the video processing unit 24 performs signal processing according to the parameter PMT on the inner frustum vBC.

Step S305 and the subsequent steps are similar to those in FIG. 20. However, the inner frustums vBCa', vBCb', and vBCc' are to be subjected to the synthesizing processing.

By displaying the monitor video vM obtained by the above processing, the operator and the camera operator of each camera 502 can monitor videos each of which has a correct background and reflects the exposure adjustment and the white balance adjustment of the camera 502.

9. Summary and Modification Examples

According to the above-described embodiments, the following effects can be obtained.

In the embodiments, the video processing unit 18 (18*a*, 18*b*, 18*c*) and the video processing unit 24 (24*a*, 24*b*, 24*c*) have been described as examples of the information processing device 70.

The information processing device 70 receives the black background captured video vCbk (first captured video) as input among the videos obtained by capturing the inner frustum vBC (corresponding video) generated corresponding to one camera 502 among the plurality of cameras 502, the display video on the LED wall 505 that displays the black video (specific video) in a time division manner, and the object by the camera 502. Then, the video processing of replacing the black video included in the input black background captured video vCbk with the inner frustum vBC generated corresponding to the camera 502 that has captured the video is performed.

In a case where the background video vB including the inner frustum vBC as the corresponding video corresponding to one camera is captured by the plurality of cameras 502, the captured video vC of the camera 502 not corresponding to the inner frustum vBC is not a video with a correct background. Therefore, the black background captured video vCbk is input, and the black video portion is replaced with the inner frustum vBC corresponding to each camera 502. As a result, a video with a correct background can be obtained for all the cameras 502.

Note that, in the first to fifth embodiments described above, not the monitor video vM generated by the video processing unit 18 or the video processing unit 24 but the main line video vCm may be used as the monitor video vM for the video that is the main line video vCm. That is, the monitor video vM may be generated by the video processing unit 18 or the video processing unit 24 for the camera 502 in which the captured video vC is not the main line video vCm.

In the first to fifth embodiments, the captured video vC (second captured video) including the object and the inner frustum vBC is a video that can be selected as the main line video vCm constituting the content among the videos obtained by capturing the display video on the LED wall 505 and the object such as the performer 510 with the camera 502.

The main line video vCm is a video selected by the switcher 600 among the videos obtained by capturing the inner frustum vBC displayed on the LED wall 505 with each camera 502. That is, the original video as the virtual production is output as the main line video vCm.

In the first to fifth embodiments, the video generated by the video processing of the video processing unit 18 or the video processing unit 24 is output as the monitor video vM used for monitor display.

For example, by replacing the black video of the background with the inner frustum vBC to obtain the monitor video vM (vNa, vMb, vMc), the monitor video vM of each camera 502 becomes a video including the correct background and the object for each camera 502.

In the first to fifth embodiments, the monitor video vM generated by the video processing of the video processing unit 18 or the video processing unit 24 is output as a video to be used for monitor display in the camera 502.

By configuring such that the video obtained by replacing the black video of the background with the inner frustum vBC is fed back to the camera 502 as the monitor video vM (vNa, vMb, vMc), the camera operators of all the cameras 502 become videos including the correct background and object for the camera 502 regardless of the display on the LED wall 505.

Therefore, the camera operator can appropriately perform the angle of view adjustment, the movement of the imaging position and the imaging direction, and the like while checking the correct background state. In particular, it is extremely suitable in a case where the camera operator performs angle of view adjustment, angle adjustment, and the like in a state where the captured video vC of the camera 502 operated by the camera operator is not the main line video vCm.

In the first to fifth embodiments, the monitor video vM generated by the video processing of the video processing unit 18 or the video processing unit 24 is output as a video to be used for monitor display in the multiviewer 612, which displays a plurality of videos in a divided manner on one screen.

The monitor video vM (vNa, vMb, vMc) in which the black video of the background is replaced with the inner frustum vBC is supplied to the multiviewer 612 and displayed. As a result, the operator or the like who operates the switcher 600 can visually recognize the captured video of each camera 502 with an appropriate background, so that the switching operation can be performed while appropriately determining the state of each captured video vC.

In the first and fourth embodiments, an example is described in which the video processing unit 18 performs the processing of replacing the black video portion with the input inner frustum vBC for each frame of the black background captured video vCbk (see FIGS. 13 to 17, 22, and 23).

For example, as in the example described with reference to FIGS. 13 to 17, the video processing unit 18 receives the inner frustum vBC supplied from the rendering engine 520 as input, and synthesizes the inner frustum vBC and the object video extracted from the black background captured video vCbk. As a result, it is possible to generate a video in which the black background is replaced with the inner frustum vBC.

In the first and fourth embodiments, the inner frustum vBC for each camera 502 is generated by the rendering engine 520, and the plurality of generated inner frustums vBC are selectively displayed on the LED wall 505. In this configuration, an example is described in which the video processing unit 18 performs processing of replacing the black video portion with the inner frustum vBC (or vBC') supplied from the rendering engine 520 for each frame of the black background captured video vCbk (see FIGS. 13 to 17, 22, and 23).

For example, as in the example described with reference to FIGS. 13 to 17, the rendering units 21, 22, and 23 of the rendering engine 520 generate the background videos vBa, vBb, and vBc each including the inner frustum vBC corresponding to the camera. These are selected by switcher 600 and displayed on the LED wall 505.

In the case of this configuration, the video processing unit 18 receives the inner frustum vBC supplied from the rendering engine 520 as input, and synthesizes the inner frustum vBC and the object video extracted from the black background captured video vCbk.

In the case of such a system configuration, since the background videos vBa, vBb, and vBc corresponding to the selected camera are generated at all times after being switched by the switcher 600 corresponding to each camera, when switching is performed by the switcher 600, a new background video vB can be immediately displayed on the LED wall 505. This is because the generation of the background video vB of another camera is not started in response to the switching instruction of the switcher 600. Therefore, a delay for generating the background video vB at the time of switching of the switcher 600 can be eliminated, and smooth switching can be performed.

In addition, the inner frustum vBC generated for each camera by the rendering units 21, 22, and 23 is utilized for monitoring without being wasted even in a period not selected by the switcher 600.

In the second, third, and fifth embodiments, the video processing unit 24 performs the processing of generating the inner frustum vBC corresponding to the camera 502 that has captured the black background captured video vCbk and the processing of replacing the black video portion of each frame of the black background captured video vCbk with the generated inner frustum vBC (see FIGS. 18 to 20, 21, and 24 to 26).

For example, as in the example described with reference to FIGS. 18 to 20, in the video processing unit 24, the rendering unit 43 generates the inner frustum vBC of the corresponding camera 502, and the inner frustum vBC and the video of the object extracted from the black background captured video vCbk are synthesized. As a result, it is possible to generate a video in which the black background is replaced with the inner frustum vBC.

In this case, the video processing unit 24 only needs to be able to render the inner frustum vBC for generating the monitor video vM in the rendering unit 43. That is, since the monitor video vM is not used as the main line video vCm, the video quality required for the main line video vCm is not required, and the video quality required for the monitor video vM is only necessary. Therefore, the rendering unit 43 only needs to perform video processing with a relatively light load, and the processing capability of the rendering units 21, 22, and 23 of the rendering engine 520 is not required. Therefore, the video processing unit 24 including the rendering unit 43 can be configured with a relatively inexpensive information processing device.

In the third and fifth embodiments, a system configuration is described in which only the inner frustum vBC of the camera 502 selected among the plurality of cameras 502 that perform imaging is generated by the rendering engine 520, and the background video vB including the generated inner frustum vBC is displayed on the LED wall 505. Then, the video processing unit 24 performs the processing of generating the inner frustum vBC corresponding to the camera 502 that has captured the black background captured video vCbk and the processing of replacing the black video portion of each frame of the black background captured video vCbk with the generated inner frustum vBC (or vBC') (see FIGS. 21, and 24 to 26).

For example, as in the example in FIG. 21, the rendering engine 520 generates the background video vB for the camera 502 selected by the switch unit 12 of the switcher 600.

With such a configuration, in the rendering engine 520, a processing load for generating the high-definition background video vB to be included in the main line video vCm can be reduced. This is because it is not necessary to generate the background videos vBa, vBb, and vBc corresponding to the plurality of cameras 502 as in the example in FIG. 18, for example.

Furthermore, even in a case of such a system configuration, the monitor video vM with the correct background can be generated for each camera 502 by including the video processing unit 24 including the rendering unit 43.

In the fourth and fifth embodiments, the video processing unit 18 or the video processing unit 24 performs processing of replacing the black video portion of each frame of the black background captured video vCbk with the inner frustum vBC (vBCa', vBCb', vBCc') to which signal processing according to the parameter PMT related to the video of the camera 502 that has captured the black background captured video vCbk has been applied (see FIGS. 22 to 26).

As a result, in a case where the exposure, the white balance, and the like on the camera 502 side are changed by the operation, automatic adjustment, and the like of the camera operator, the change is also reflected in the monitor video vM, so that correct monitor display according to the current parameters can be realized.

In the fourth embodiment, the inner frustum vBC for each camera 502 is generated by the rendering engine 520, and a plurality of the generated inner frustums vBC is selectively displayed on the LED wall 505. Then, an example is described in which the video processing unit 18 performs processing of replacing the black video portion of each frame of the black background captured video vCbk with the inner frustum vBC (vBCa', vBCb', vBCc') to which the signal processing according to the parameter PMT has been applied by the rendering engine 520 (see FIGS. 22 and 23).

In the rendering units 21, 22, and 23 of the rendering engine 520, the video signal processing according to the parameters PMT such as exposure and white balance is performed on the video data of the inner frustum vBC, so that correct monitor display serving as a background according to the adjustment operation of the camera 502 or the like can be realized.

In the fifth embodiment, the video processing unit 24 generates the inner frustum vBC corresponding to the camera 502 that has captured the black background captured video vCbk, performs signal processing according to the parameter PMT, and replaces the black video portion of the black background captured video vCbk with the generated inner frustum vBC (see FIGS. 24 to 26).

The video processing unit 24 performs signal processing according to the parameter PMT on the inner frustum vBC. By synthesizing the processed inner frustum vBC (vBCa', vBCb', vBCc') and the object video, it is possible to realize correct monitor display serving as a background according to the adjustment operation of the camera 502 or the like. It is possible to realize correct monitor display serving as a background according to the parameter PMT.

In the imaging system 500 of the embodiments, the display video on the LED wall 505 is a video in which the black video as the specific video and the inner frustum vBC (the background video vB including the inner frustum vBC) as the corresponding video are alternately displayed for each frame. Then, each camera 502 captures each frame in synchronization with the display, and outputs the black background captured video vCbk in which frames including the black video are continuous and the captured video vC in which frames including the inner frustum vBC are continuous in parallel. In such an imaging system 500, the video processing unit 18 and the video processing unit 24 only need to receive the black background captured video vCbk as input and replace each frame with the inner frustum vBC corresponding to the camera 502.

The specific video in the embodiment is a video used for video separation processing.

Video processing for generating the monitor video vM becomes easy by using a video that can be separated by a chroma key or the like, such as a black video, a green video, or a blue video, as the specific video.

Furthermore, in the embodiments, the specific video used in the video separation processing is the black video, and the black background captured video vCbk is a video in which the object is captured with the black video as the background.

By using the black video as the specific video, the influence of the video change on the LED wall 505 in a high frequency period on the performer 510 can be reduced as compared with the blue video and the green video.

The corresponding video in the embodiments is a background video generated according to the position or the imaging direction of the camera 502. That is, the corresponding video is the inner frustum vBC rendered on the basis of the imaging information including the position and the imaging direction of the camera 502 with respect to the LED wall 505. The monitor video vM of each camera is a video in which the inner frustum vBC is optimized.

A program of the embodiments is a program for causing a processor, for example, a CPU, a DSP, or the like, or a device including the processor to execute the process as illustrated in FIGS. 17, 20, and 26 described above.

That is, the program of the embodiments causes the information processing device 70 such as the video processing units 18 and 24, which receives the black background captured video vCbk (first captured video) including the object and the specific video as input, among videos obtained by capturing the display video on the LED wall 505 and the object such as the performer 510 by the camera 502, to execute the video processing, the display video displaying the inner frustum vBC generated corresponding to one camera 502 among the plurality of cameras 502 and the specific video such as the black video in a time division manner. The video processing is video processing of replacing the specific video included in the black background captured video vCbk with the inner frustum vBC generated corresponding to the camera 502 that has captured the black background captured video vCbk.

With such a program, the information processing device 70 that executes the above-described video processing can be implemented by various computer apparatuses.

Such a program can be recorded in advance in an HDD as a recording medium built in a device such as a computer device, a ROM in a microcomputer having a CPU, or the like. Furthermore, such a program can be temporarily or permanently stored (recorded) in a removable recording medium such as a flexible disk, a compact disc read only memory (CD-ROM), a magneto optical (MO) disk, a digital versatile disc (DVD), a Blu-ray Disc (registered trademark), a magnetic disk, a semiconductor memory, or a memory card. Such a removable recording medium can be provided as what is called package software.

Furthermore, such a program can be installed from the removable recording medium into a personal computer and the like, or can be downloaded from a download site through a network such as a local area network (LAN) or the Internet.

Furthermore, such a program is suitable for providing the information processing device 70 of the embodiment in a wide range. For example, by downloading the program to a personal computer, a communication device, a portable terminal device such as a smartphone or a tablet, a mobile phone, a game device, a video device, a personal digital assistant (PDA), or the like, these devices can be caused to function as the information processing device 70 of the present disclosure.

Note that the effects described in the present description are merely examples and are not limited, and other effects may be provided.

Note that the present technology can also have the following configurations.

(1)

An information processing device, including a video processing unit that performs video processing of replacing a specific video with a corresponding video for a first captured video including an object and the specific video, the corresponding video being generated corresponding to a camera that captures the first captured video, the first captured video being a video among videos obtained by capturing a display video on a display and the object separated from the display by a camera, the display displaying a corresponding video generated corresponding to one camera among a plurality of cameras and a specific video in a time-division manner.

(2)

The information processing device according to (1), in which a second captured video is a video that can be selected as a main line video, the second captured video including the object and the corresponding video generated corresponding to the one camera among videos obtained by capturing the display video on the display and the object by the camera.

(3)

The information processing device according to (1) or (2), in which a video generated by the video processing is output as a video to be used for monitor display.

(4)

The information processing device according to any one of (1) to (3), in which the video generated by the video processing is output as a video to be used for monitor display in a camera.

(5)

The information processing device according to any one of (1) to (4), in which the video generated by the video processing is output as a video to be used for monitor display in which a plurality of videos is displayed in a divided manner on one screen.

(6)

The information processing device according to any one of (1) to (5), in which in the video processing, processing of replacing a portion of the specific video with the input corresponding video for each frame of the first captured video is performed.

(7)

The information processing device according to any one of (1) to (6), in which a corresponding video for each camera is generated by a rendering engine, and a plurality of the generated corresponding videos is selectively displayed on the display, and in the video processing, processing of replacing a portion of the specific video of each frame of the first captured video with the corresponding video supplied from the rendering engine is performed.

(8)

The information processing device according to any one of (1) to (5), in which in the video processing, processing of generating a corresponding video corresponding to a camera that captures the first captured video and processing of replacing a portion of the specific video with the generated corresponding video for each frame of the first captured video are performed.

(9)

The information processing device according to any one of (1) to (5), in which in a system configuration in which only a corresponding video for a camera selected among a plurality of cameras that performs imaging is generated by a rendering engine, and the generated corresponding video is displayed on the display, in the video processing, processing of generating a corresponding video corresponding to a camera that captures the first captured video is performed and processing of replacing a portion of the specific video with the generated corresponding video for each frame of the first captured video are performed.

(10)

The information processing device according to any one of (1) to (9), in which in the video processing, for each frame of the first captured video, processing of replacing a portion of the specific video with a corresponding video to which signal processing according to a parameter related to a video of a camera that captures the first captured video is applied is performed.

(11)

The information processing device according to any one of (1), (2), (3), (4), (5), (6), (7), and (10), in which a corresponding video for each camera is generated by a rendering engine, and a plurality of the generated corresponding videos is selectively displayed on the display, and in the video processing, processing of replacing a portion of the specific video of each frame of the first captured video with the corresponding video to which signal processing according to a parameter related to a video of a camera that captures the first captured video is applied by the rendering engine is performed.

(12)

The information processing device according to any one of (1), (2), (3), (4), (5), (8), (9), and (10), in which in the video processing, a corresponding video corresponding to a camera that captures the first captured video is generated, signal processing on the generated corresponding video according to a parameter related to a video of the camera that captures the first captured video is performed, and a portion of the specific video of the first captured video is replaced with the corresponding video.

(13)

The information processing device according to (2), in which the display video on the display includes a video in which the specific video and the corresponding video are alternately displayed for each frame, and each camera receives the first captured video as input and performs the video processing in an imaging system in which the first captured video in which frames including the specific video are continuous and the second captured video in which frames including the corresponding video are continuous are output in parallel.

(14)

The information processing device according to any one of (1) to (13), in which the specific video includes a video to be used for video separation processing.

(15)

The information processing device according to any one of (1) to (13), in which the specific video includes a black video, and the first captured video includes a video in which an object is captured with a black video as a background.

(16)

The information processing device according to any one of (1) to (15), in which the corresponding video includes a background video generated according to a position or an imaging direction of a camera.

(17)

An information processing method, including performing video processing of replacing a specific video with a corresponding video for a first captured video including an object and the specific video, the corresponding video being generated corresponding to a camera that captures the first captured video, the first captured video being a video among videos obtained by capturing a display video on a display and the object separated from the display by a camera, the display displaying a corresponding video generated corresponding to one camera among a plurality of cameras and a specific video in a time-division manner.

(18)

An imaging system, including:

a display;

a plurality of cameras that captures a video displayed on the display; and an information processing device that performs processing of videos to be captured by the plurality of cameras, in which the display displays a corresponding video generated corresponding to one of the plurality of cameras and a specific video in a time-division manner, and the information processing device includes a video processing unit that performs video processing of replacing the specific video with a corresponding video for a first captured video including an object and the specific video, the corresponding video being generated corresponding to a camera that captures the first captured video, the first captured video being a video among videos obtained by capturing a display video on the display and the object separated from the display by the camera.

REFERENCE SIGNS LIST

10 Switcher controller (SW controller)
11 Switch unit
12 Switch unit
18, 18a, 18b, 18c Video processing unit
21, 22, 23 Rendering unit
24, 24a, 24b, 24c Video processing unit
28 Selector
41 Object extraction unit
42 Synthesis unit
43 Rendering unit
44 Signal processing unit
70 Information processing device
71 CPU
85 Video processing unit
502 Camera
505 LED wall
510 Performer
515a, 515b Camera signal processing unit
520 Rendering engine
600 Switcher
612 Multiviewer vB Background video
vBC Capturing region video (inner frustum)
vC, vCa, vCb, vCc Captured video
vCbk Black background captured video
vCm Main line video
vM, vNa, vMb, vMc Monitor video

The invention claimed is:

1. An information processing device, comprising circuitry configured to:

perform video processing of replacing, in a first captured video including an object and a specific video displayed on a display, the specific video with a first corresponding video, the specific video being generated independently of a first camera that captures the first captured video, the first corresponding video being generated in correspondence with the first camera and the display displaying a second corresponding video generated in correspondence with a second camera being different from the first camera and the specific video in a time-division manner.

2. The information processing device according to claim 1, wherein a second captured video includes a video that can be selected as a main line video, the second captured video including the object and the first corresponding video.

3. The information processing device according to claim 1, wherein a video generated by the video processing is output as a video to be used for monitor display.

4. The information processing device according to claim 1, wherein a video generated by the video processing is output as a video to be used for monitor display in a camera.

5. The information processing device according to claim 1, wherein a video generated by the video processing is output as a video to be used for monitor display in which a plurality of videos is displayed in a divided manner on one screen.

6. The information processing device according to claim 1, wherein in the video processing, processing of replacing a portion of the specific video with the first corresponding video for each frame of the first captured video is performed.

7. The information processing device according to claim 1, wherein a corresponding video for each of a plurality of cameras is generated by a rendering engine, and a plurality of the generated corresponding videos is selectively displayed on the display, and in the video processing, processing of replacing a portion of the specific video of each frame of the first captured video with the corresponding video supplied from the rendering engine is performed.

8. The information processing device according to claim 1, wherein in the video processing, processing of generating the first corresponding video corresponding to the first camera, and processing of replacing a portion of the specific video with the generated corresponding video for each frame of the first captured video are performed.

9. The information processing device according to claim 1, wherein in a system configuration in which only a corresponding video for a camera selected among a plurality of cameras that performs imaging is generated by a rendering engine, and the generated corresponding video is displayed on the display, in the video processing, processing of generating a corresponding video corresponding to the first camera, and processing of replacing a portion of the specific video with the generated corresponding video for each frame of the first captured video are performed.

10. The information processing device according to claim 1, wherein in the video processing, for each frame of the first captured video, processing of replacing a portion of the specific video with the first corresponding video to which signal processing according to a parameter related to a video of the first camera that captures the first captured video is applied is performed.

11. The information processing device according to claim 1, wherein a corresponding video for each of a plurality of cameras is generated by a rendering engine, and a plurality of the generated corresponding videos is selectively displayed on the display, and in the video processing, processing of replacing a portion of the specific video of each frame of the first captured video with the corresponding video to which signal processing according to a parameter related to a video of the camera that captures the first captured video is applied by the rendering engine is performed.

12. The information processing device according to claim 1, wherein in the video processing, the corresponding video corresponding to the camera that captured the first captured video is generated, signal processing on the generated corresponding video according to a parameter related to a video of the camera that captures the first captured video is performed, and a portion of the specific video of the first captured video is replaced with the corresponding video.

13. The information processing device according to claim 2, wherein the display displays the specific video and the corresponding video being alternately displayed for each frame, and each of a plurality of cameras receives the first captured video as input and performs the video processing in an imaging system in which the first captured video in which frames including the specific video are continuous and the second captured video in which frames including the corresponding video are continuous are output in parallel.

14. The information processing device according to claim 1, wherein the specific video includes a video to be used for video separation processing.

15. The information processing device according to claim 1, wherein the specific video includes a black video, and the first captured video includes a video in which an object is captured with a black video as a background.

16. The information processing device according to claim 1, wherein the corresponding video includes a background video generated according to a position or an imaging direction of the camera.

17. An information processing method, comprising:

performing video processing of replacing, in a first captured video including an object and a specific video displayed on a display, the specific video with a first corresponding video, the specific video being generated independently of a first camera that captures the first captured video, the first corresponding video being generated in correspondence with the first camera and the display displaying a second corresponding video generated in correspondence with a second camera being different from the first camera and the specific video in a time-division manner.

18. An imaging system, comprising:

a display;

a plurality of cameras that captures a video displayed on the display; and an information processing device that performs processing of videos to be captured by the plurality of cameras, wherein the display displays a corresponding video generated corresponding to one of the plurality of cameras and a specific video in a time-division manner, and the information processing device includes a video processing unit that performs video processing of replacing the specific video with a corresponding video for a first captured video including an object and the specific video, the corresponding video being generated corresponding to a camera that captures the first captured video, the first captured video being a video among videos obtained by capturing a display video on the display and the object separated from the display by the camera.

* * * * *